United States Patent
Yoshida et al.

(10) Patent No.: US 11,685,430 B2
(45) Date of Patent: Jun. 27, 2023

(54) MOTOR CONTROL DEVICE

(71) Applicant: JTEKT CORPORATION, Osaka (JP)

(72) Inventors: Mitsuko Yoshida, Nara (JP); Naoki Shoji, Shiki-gun (JP); Robert Fuchs, Nara (JP)

(73) Assignee: JTEKT CORPORATION, Kariya (JP)

( * ) Notice: Subject to any disclaimer, the term of this patent is extended or adjusted under 35 U.S.C. 154(b) by 439 days.

(21) Appl. No.: 17/055,846

(22) PCT Filed: Apr. 25, 2019

(86) PCT No.: PCT/JP2019/017717
§ 371 (c)(1),
(2) Date: Nov. 16, 2020

(87) PCT Pub. No.: WO2019/225289
PCT Pub. Date: Nov. 28, 2019

(65) Prior Publication Data
US 2021/0253161 A1    Aug. 19, 2021

(30) Foreign Application Priority Data

May 21, 2018 (JP) ................................. 2018-097395
Sep. 27, 2018 (JP) ................................. 2018-182676

(51) Int. Cl.
*B62D 6/00* (2006.01)
*B62D 5/04* (2006.01)
*B62D 15/02* (2006.01)

(52) U.S. Cl.
CPC ............. *B62D 6/00* (2013.01); *B62D 5/0457* (2013.01); *B62D 15/021* (2013.01)

(58) Field of Classification Search
CPC ...... B62D 6/00; B62D 5/0457; B62D 15/021; B62D 5/0463; B62D 5/00; B62D 5/005
See application file for complete search history.

(56) References Cited

U.S. PATENT DOCUMENTS

2006/0041356 A1    2/2006 Shirato et al.
2006/0090952 A1    5/2006 Ito
(Continued)

FOREIGN PATENT DOCUMENTS

CN    103153758 A    6/2013
CN    105818855 A    8/2016
(Continued)

OTHER PUBLICATIONS

Jul. 23, 2019 International Search Report issued in International Patent Application No. PCT/JP2019/017717.
(Continued)

*Primary Examiner* — Jeff A Burke
*Assistant Examiner* — Joshua Alexander Garza
(74) *Attorney, Agent, or Firm* — Oliff PLC

(57) ABSTRACT

A motor controlling ECU 202 includes an automatic steering controller 42 that sets an automatic steering control amount, an assist controller 41 that sets an assist control amount, an integrated control amount calculating portion 43 that calculates an integrated control amount by adding the automatic steering control amount and the assist control amount, and an actual automatic steering angle calculating portion 46 that calculates, based on at least one of either of a steering torque and the assist control amount, an actual automatic steering angle that is a steering angle due to automatic steering control and included in an actual steering angle. The automatic steering controller 42 uses a target automatic steering angle and the actual automatic steering angle to set the automatic steering control amount.

10 Claims, 14 Drawing Sheets

(56) References Cited

U.S. PATENT DOCUMENTS

| | | | |
|---|---|---|---|
| 2016/0229447 A1* | 8/2016 | Wada | B62D 6/007 |
| 2016/0280256 A1* | 9/2016 | Wei | B62D 5/0469 |
| 2017/0088166 A1 | 3/2017 | Kunihiro et al. | |
| 2017/0088174 A1* | 3/2017 | Inoue | B62D 6/003 |
| 2018/0037256 A1 | 2/2018 | Maeda et al. | |
| 2018/0134310 A1* | 5/2018 | Benak | B62D 5/008 |
| 2018/0201306 A1 | 7/2018 | Tsubaki | |
| 2018/0312169 A1 | 11/2018 | Harai | |
| 2019/0359247 A1* | 11/2019 | Tsubaki | B62D 1/286 |
| 2020/0108857 A1* | 4/2020 | Tsubaki | B62D 5/04 |
| 2021/0206426 A1* | 7/2021 | Kitazume | B62D 5/0409 |

FOREIGN PATENT DOCUMENTS

| | | |
|---|---|---|
| CN | 106414220 A | 2/2017 |
| CN | 107697153 A | 2/2018 |
| JP | H11-286280 A | 10/1999 |
| JP | 2002-29437 A | 1/2002 |
| JP | 2006-56372 A | 3/2006 |
| JP | 2006-123663 A | 5/2006 |
| JP | 2015-20604 A | 2/2015 |
| JP | 2015-33942 A | 2/2015 |
| JP | 2016-203897 A | 12/2016 |
| JP | 2017-61284 A | 3/2017 |
| JP | 2017-77811 A | 4/2017 |
| JP | 2018-24281 A | 2/2018 |
| JP | 2018-39440 A | 3/2018 |
| WO | 2017/213130 A1 | 12/2017 |

OTHER PUBLICATIONS

Nov. 24, 2020 International Preliminary Report on Patentability issued in International Patent Application No. PCT/JP2019/017717.

* cited by examiner

MOTOR CONTROL DEVICE

TECHNICAL FIELD

The present invention relates to a motor control device that controls an electric motor for steering angle control.

BACKGROUND ART

An electric power steering (EPS) system that includes an assist control calculating portion, a target following control calculating portion, an intervention detecting portion, an adder, and a motor drive circuit is disclosed in the following Patent Literature 1. The assist control calculating portion generates an assist command for generating an assist torque that lightens a steering load based on a steering torque, etc. The target following control calculating portion generates a following command for generating an automatic steering torque necessary for making a motor rotation angle (actual angle) follow a target angle. The adder adds the assist command and the following command. The motor drive circuit drives an electric motor based on the addition result of the adder (sum value of the assist command and the following command). The intervention detecting portion calculates an intervention factor based on the steering torque and provides it to the target following control calculating portion. The target following control calculating portion restricts the following command based on the intervention factor.

CITATION LIST

Patent Literature

Patent Literature 1: Japanese Patent Application Publication No. 2015-20604

SUMMARY OF INVENTION

Technical Problem

The target following control calculating portion described in Patent Literature 1 generates a basic value of the following command (integration object value) by performing a PID calculation (feedback control) on a deviation of the target angle and the motor rotation angle. However, when manual steering is being performed, the motor rotation angle that is detected includes an angle based on the manual steering (angle corresponding to the manual steering and assist control) in addition to the angle based on the following command (angle corresponding to the automatic steering control) and therefore, a proper following command cannot be generated. Therefore, with the EPS of Patent Literature 1, appropriate following control (automatic steering control) cannot be performed when the assist control that is in accordance with the manual steering is being performed.

An object of the present invention is to provide a motor control device with which coexistence of automatic steering control and assist control in accordance with manual steering is possible.

Solution to Problem

A preferred embodiment of the present invention provides a motor control device including a torque detector (12) that is arranged to detect a steering torque, a steering angle detector (23, 45) that is arranged to detect an actual steering angle, an automatic steering controller (42) that sets an automatic steering control amount, an assist controller (41) that sets an assist control amount using the steering torque, an integrated control amount calculating portion (43) that calculates an integrated control amount by adding the automatic steering control amount and the assist control amount, and a controller (44) that controls the electric motor based on the integrated control amount, a motor control device further including an actual automatic steering angle calculating portion (46) that calculates, based on at least one of either of the steering torque and the assist control amount and on the actual steering angle, an actual automatic steering angle that is a steering angle corresponding to automatic steering and included in the actual steering angle and the automatic steering controller (42) setting the automatic steering control amount using a target automatic steering angle and the actual automatic steering angle.

With the present arrangement, the actual automatic steering angle that is the steering angle due to the automatic steering control and included in the actual steering angle is calculated by the actual automatic steering angle calculating portion. A steering angle based on manual steering (steering angle due to the manual steering and assist control) is not included in the actual automatic steering angle used in setting the automatic steering control amount and therefore, even when the manual steering is performed during the automatic steering control, a proper automatic steering control amount is set and performing of appropriate automatic steering control is enabled.

Also, by controlling the electric motor based on the integrated control amount calculated by adding the assist control amount to the automatic steering control amount, it is possible to realize the assist control in accordance with the manual steering while performing steering control mainly by the automatic steering control. Coexistence of the automatic steering control and the assist control in accordance with the manual steering is thereby made possible and seamless transition between the two is enabled.

In the preferred embodiment of the present invention, the actual automatic steering angle calculating portion includes an actual manual steering angle calculating portion (46A) that calculates, based on at least one of either of the steering torque and the assist control amount, an actual manual steering angle that is a steering angle due to manual steering and assist control and included in the actual steering angle and a subtractor (46B) that calculates the actual automatic steering angle by subtracting the actual manual steering angle from the actual steering angle.

In the preferred embodiment of the present invention, the actual manual steering angle calculating portion is arranged to calculate the actual manual steering angle using a reference model of a steering system (1) that includes the electric motor.

In the preferred embodiment of the present invention, the automatic steering controller includes a disturbance torque estimator (64) that uses the automatic steering control amount and the actual automatic steering angle to calculate an automatic disturbance torque estimate that is an estimate of a disturbance torque corresponding to automatic steering and included in a disturbance torque besides a motor torque acting on a driven object of the electric motor and an estimate of the actual automatic steering angle, a target basic torque calculating portion (61 to 65) that calculates a target basic torque using the target automatic steering angle and the estimate of the actual automatic steering angle, and a disturbance torque compensator (65) that corrects the target basic torque by the automatic disturbance torque estimate.

With the present arrangement, the disturbance torque estimator calculates the automatic disturbance torque estimate based on the automatic steering control amount and the actual automatic steering angle. The disturbance torque compensator then uses the automatic disturbance torque estimate to correct the target basic torque. That is, the automatic steering controller compensates for the disturbance torque corresponding to the automatic steering but does not compensate for a torque that gives rise to a steering angle corresponding to the manual steering. It is thereby made possible to perform the assist control in accordance with the manual steering even during the automatic steering control.

In the preferred embodiment of the present invention, the automatic steering controller includes a disturbance torque estimator (64) that uses the automatic steering control amount and the actual automatic steering angle to calculate an automatic disturbance torque estimate that is an estimate of a disturbance torque corresponding to automatic steering and included in a disturbance torque besides a motor torque acting on a driven object of the electric motor, a target basic torque calculating portion (61 to 65) that calculates a target basic torque using the target automatic steering angle and the actual automatic steering angle, and a disturbance torque compensator (66) that corrects the target basic torque by the automatic disturbance torque estimate.

With the present arrangement, it is made possible to perform the assist control in accordance with the manual steering even during the automatic steering control.

In the preferred embodiment of the present invention, a first weighting portion (111) that performs, in accordance with predetermined first information, a weighting process on the automatic steering control amount set by the automatic steering controller is further included and the integrated control amount calculating portion is arranged to calculate the integrated control amount by adding the automatic steering control amount after the weighting process by the first weighting portion and the assist control amount.

In the preferred embodiment of the present invention, a second weighting portion (117) that performs, in accordance with predetermined second information, a weighting process on the steering torque detected by the torque detector is further included, the assist controller is arranged to set the assist control amount using the steering torque after the weighting process by the second weighting portion, the actual automatic steering angle calculating portion is arranged to calculate the actual automatic steering angle based on the steering torque after the weighting process by the second weighting portion, the assist control amount calculated by the assist controller, and the actual steering angle, and the integrated control amount calculating portion is arranged to calculate the integrated control amount by adding the automatic steering control amount and the assist control amount calculated by the assist controller.

In the preferred embodiment of the present invention, a third weighting portion (118) that performs, in accordance with predetermined third information, a weighting process on the assist control amount set by the assist controller and a fourth weighting portion (119) that performs, in accordance with predetermined fourth information, a weighting process on the actual manual steering angle calculated by the actual manual steering angle calculating portion are further included, the subtractor is arranged to calculate the actual automatic steering angle by subtracting the actual manual steering angle after the weighting process by the fourth weighting portion from the actual steering angle, and the integrated control amount calculating portion is arranged to calculate the integrated control amount by adding the automatic steering control amount and the assist control amount after the weighting process by the third weighting portion.

In the preferred embodiment of the present invention, a fifth weighting portion (112) that performs, in accordance with predetermined fifth information, a weighting process on the automatic steering control amount set by the automatic steering controller and a sixth weighting portion (113) that performs, in accordance with predetermined sixth information, a weighting process on the steering torque detected by the torque detector are further included, the assist controller is arranged to set the assist control amount using the steering torque after the weighting process by the sixth weighting portion, the actual automatic steering angle calculating portion is arranged to calculate the actual automatic steering angle based on the steering torque after the weighting process by the sixth weighting portion, the assist control amount calculated by the assist controller, and the actual steering angle, and the integrated control amount calculating portion is arranged to calculate the integrated control amount by adding the automatic steering control amount after the weighting process by the fifth weighting portion and the assist control amount calculated by the assist controller.

In the preferred embodiment of the present invention, a seventh weighting portion (114) that performs, in accordance with predetermined seventh information, a weighting process on the automatic steering control amount set by the automatic steering controller, an eighth weighting portion (115) that performs, in accordance with predetermined eighth information, a weighting process on the assist control amount set by the assist controller, and a ninth weighting portion (116) that performs, in accordance with predetermined ninth information, a weighting process on the actual manual steering angle calculated by the actual manual steering angle calculating portion are further included, the subtractor is arranged to calculate the actual automatic steering angle by subtracting the actual manual steering angle after the weighting process by the ninth weighting portion from the actual steering angle, and the integrated control amount calculating portion is arranged to calculate the integrated control amount by adding the automatic steering control amount after the weighting process by the seventh weighting portion and the assist control amount after the weighting process by the eighth weighting portion.

The aforementioned as well as yet other objects, features, and effects of the present invention will be made clear by the following description of a preferred embodiment made with reference to the accompanying drawings.

DESCRIPTION OF EMBODIMENTS

Figure 1:
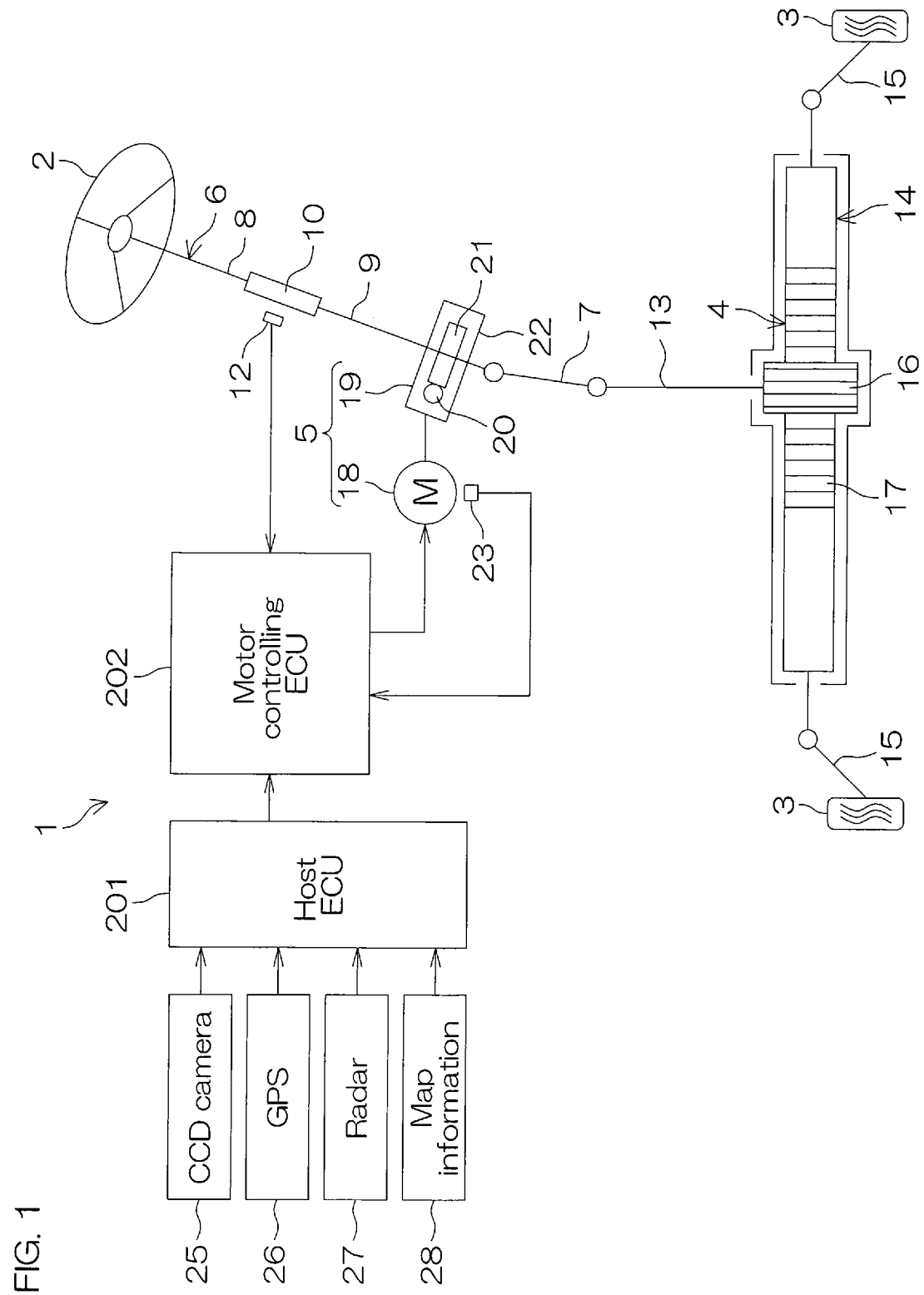
FIG. 1 is a schematic view of the general arrangement of an electric power steering system to which a motor control device according to a preferred embodiment of the present invention is applied.

FIG. 1 is a schematic view of the general arrangement of an electric power steering system to which a motor control device according to a preferred embodiment of the present invention is applied.

The electric power steering system 1 includes a steering wheel (handle) 2 as a steering member arranged to steer a vehicle, a turning mechanism 4 that turns turned wheels 3 in linkage with rotation of the steering wheel 2, and a steering assisting mechanism 5 arranged to assist steering by a driver. The steering wheel 2 and the turning mechanism 4 are mechanically coupled via a steering shaft 6 and an intermediate shaft 7.

The steering shaft 6 includes an input shaft 8 coupled to the steering wheel 2 and an output shaft 9 coupled to the intermediate shaft 7. The input shaft 8 and the output shaft 9 are relatively rotatably coupled via a torsion bar 10.

A torque sensor 12 is disposed in a vicinity of the torsion bar 10. The torque sensor 12 detects a torsion bar torque (steering torque) $T_{tb}$ applied to the torsion bar 10 based on a relative rotational displacement amount of the input shaft 8 and the output shaft 9. In the present preferred embodiment, the torsion bar torque $T_{tb}$ detected by the torque sensor 12 is deemed to be such that, for example, a torque for steering in a left direction is detected as a positive value, a torque for steering in a right direction is detected as a negative value, and the greater its absolute value, the greater the magnitude of the torsion bar torque $T_{tb}$.

The turning mechanism 4 is constituted of a rack and pinion mechanism that includes a pinion shaft 13 and a rack shaft 14 as a turning shaft. The turned wheels 3 are coupled via tie rods 15 and knuckle arms (not shown) to respective end portions of the rack shaft 14. The pinion shaft 13 is coupled to the intermediate shaft 7. The pinion shaft 13 is arranged to rotate in linkage with the steering of the steering wheel 2. A pinion 16 is coupled to a tip of the pinion shaft 13.

The rack shaft 14 extends rectilinearly along a right/left direction of the vehicle. A rack 17 engaged with the pinion 16 is formed at an intermediate portion in an axial direction of the rack shaft 14. By the pinion 16 and the rack 17, rotation of the pinion shaft 13 is converted to axial direction movement of the rack shaft 14. By moving the rack shaft 14 in the axial direction, it is possible to turn the turned wheels 3.

When the steering wheel 2 is steered (rotated), the rotation is transmitted to the pinion shaft 13 via the steering shaft 6 and the intermediate shaft 7. The rotation of the pinion shaft 13 is then converted to the axial direction movement of the rack shaft 14 by the pinion 16 and the rack 17. The turned wheels 3 are thereby turned.

The steering assisting mechanism 5 includes an electric motor 18 arranged to generate a steering assisting force (assist torque) and a speed reducer 19 arranged to amplify and transmit an output torque of the electric motor 18 to the turning mechanism 4. The speed reducer 19 is constituted of a worm gear mechanism that includes a worm gear 20 and a worm wheel 21 engaged with the worm gear 20. The speed reducer 19 is housed inside a gear housing 22 as a transmission mechanism housing. In the following description, a speed reduction ratio (gear ratio) of the speed reducer 19 is represented at times by N. The speed reduction ratio N is defined as a ratio $\omega_{wg}/\omega_{ww}$ of an angular speed $\omega_{wg}$ of the worm gear 20 with respect to an angular speed $\omega_{ww}$ of the worm wheel 21.

The worm gear 20 is driven to rotate by the electric motor 18. Also, the worm wheel 21 is integrally rotatably coupled to the output shaft 9.

When the worm gear 20 is driven to rotate by the electric motor 18, the worm wheel 21 is driven to rotate, a motor torque is applied to the steering shaft 6, and the steering shaft 6 (output shaft 9) rotates. The rotation of the steering shaft 6 is then transmitted to the pinion shaft 13 via the intermediate shaft 7. The rotation of the pinion shaft 13 is then converted to the axial direction movement of the rack shaft 14. The turned wheels 3 are thereby turned. That is, steering assistance by the electric motor 18 and turning of the turned wheels 3 are made possible by the worm gear 20 being driven to rotate by the electric motor 18. The electric motor 18 is provided with a rotation angle sensor 23 arranged to detect a rotation angle of a rotor of the electric motor 18.

As torques applied to the output shaft 9 (an example of a driven object of the electric motor 18) there are the motor torque applied by the electric motor 18 and a disturbance torque besides the motor torque. The torsion bar torque $T_{tb}$, a road surface load torque (road surface reaction torque) $T_{rl}$, a friction torque $T_f$ generated in the speed reducer 19, etc., are included in the disturbance torque $T_{lc}$ besides the motor torque.

The torsion bar torque $T_{tb}$ is a torque applied to the output shaft 9 from the steering wheel 2 side by a force applied to the steering wheel 2 by the driver, a force generated by steering inertia, etc.

The road surface load torque $T_{rl}$ is a torque applied to the output shaft 9 from the turned wheels 3 side and via the rack shaft 14 by a self-aligning torque generated at tires, forces generated by a suspension and by tire wheel alignment, a frictional force of the rack and pinion mechanism, etc.

The vehicle is installed with a CCD (charge coupled device) camera 25 that takes an image of a road in front in a travel direction of the vehicle, a GPS (global positioning system) 26 arranged to detect an own vehicle position, a radar 27 arranged to detect road shape and obstacles, and a map information memory 28 that stores map information.

The CCD camera 25, the GPS 26, the radar 27, and the map information memory 28 are connected to a host ECU (electronic control unit) 201 arranged to perform operation support control and automatic operation control. Based on information obtained by the CCD camera 25, the GPS 26, and the radar 27 and on the map information, the host ECU 201 performs peripheral environment recognition, own vehicle position estimation, route planning, etc., and determines control target values for steering and driving actuators.

In the present preferred embodiment, the host ECU 201 sets a target automatic steering angle $\theta_{c,cmda}$ for automatic steering. In the present preferred embodiment, automatic steering control is control, for example, for making the vehicle travel along a target track. The target automatic steering angle $\theta_{c,cmda}$ is a target value of a steering angle for making the vehicle perform automatic travel along the target track. A process for setting such a target automatic steering angle $\theta_{c,cmda}$ is well known and therefore a detailed description is omitted here.

The target automatic steering angle $\theta_{c,cmda}$ set by the host ECU 201 is provided via an onboard network to a motor controlling ECU 202. The torsion bar torque $T_{tb}$ detected by the torque sensor 12 and an output signal of the rotation angle sensor 23 are input into the motor controlling ECU 202. The motor controlling ECU 202 controls the electric motor 18 based on these input signals and information provided from the host ECU 201.

Figure 2:
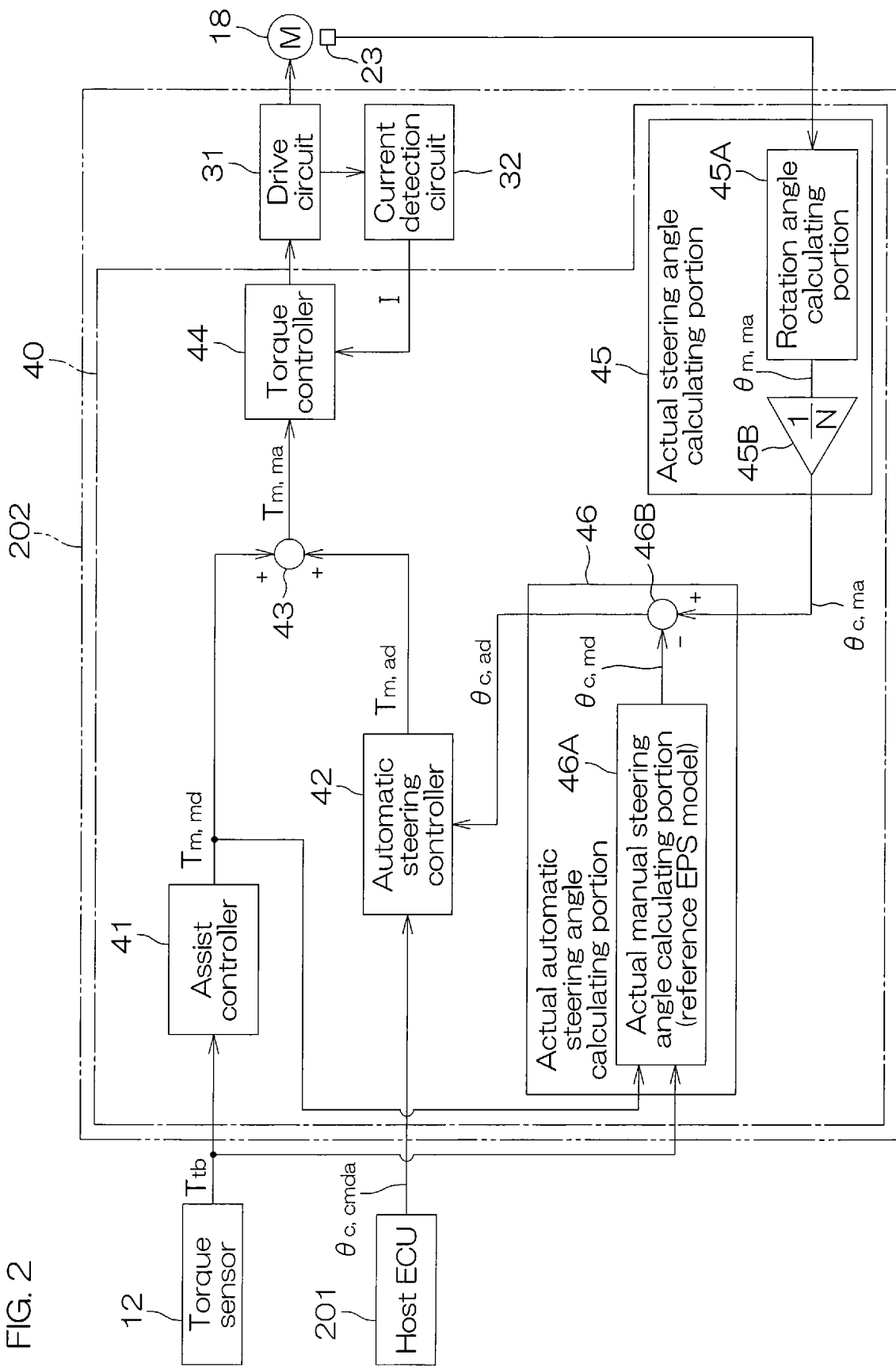
FIG. 2 is a block diagram for describing the electrical arrangement of a motor controlling ECU.

FIG. 2 is a block diagram for describing the electrical arrangement of the motor controlling ECU 202.

The motor controlling ECU 202 includes a microcomputer 40, a drive circuit (inverter circuit) 31 controlled by the microcomputer 40 and supplying power to the electric motor 18, and a current detection circuit 32 arranged to detect a current flowing through the electric motor 18 (hereinafter referred to as the "motor current I").

The microcomputer 40 includes a CPU and a memory (a ROM, a RAM, a nonvolatile memory, etc.) and is arranged to function as a plurality of function processing portions by execution of a predetermined program. The plurality of function processing portions include an assist controller 41, an automatic steering controller 42, an integrated torque calculating portion (integrated control amount calculating portion) 43, a torque controller (controller) 44, an actual steering angle calculating portion 45, and an actual automatic steering angle calculating portion 46.

Figure 3:
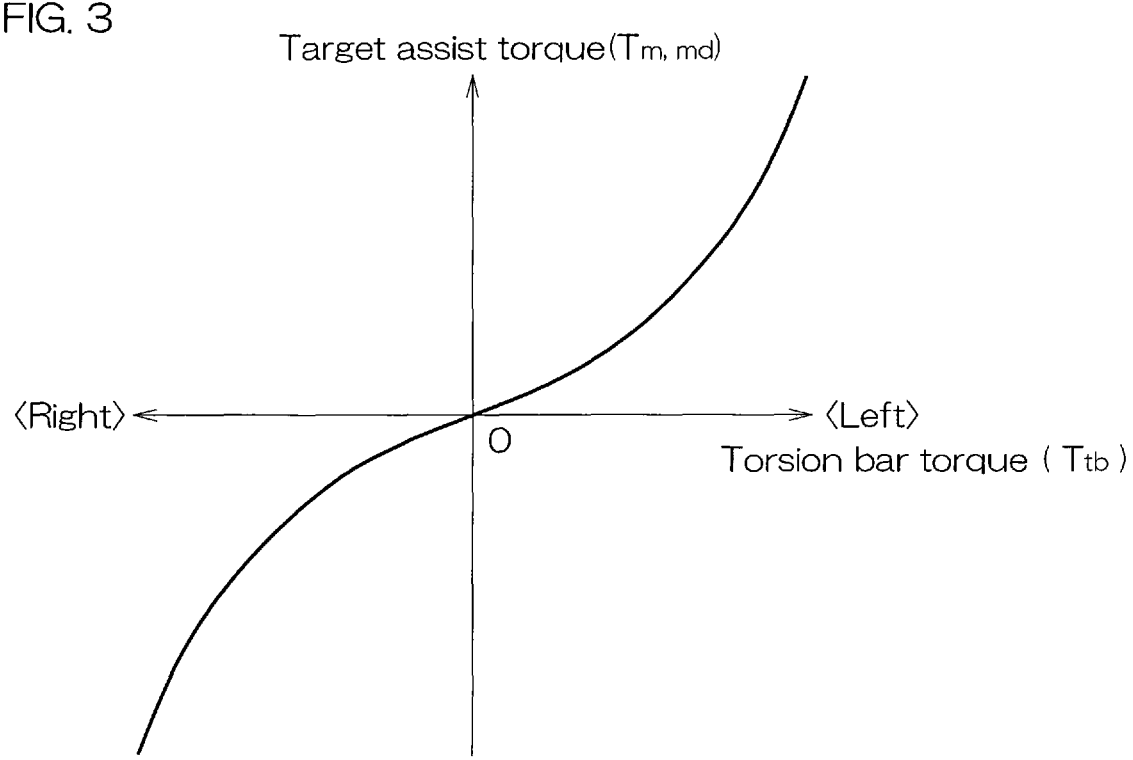
FIG. 3 is a graph of a setting example of a target assist torque $T_{m,md}$ with respect to a torsion bar torque $T_{tb}$.

The assist controller 41 sets a target assist torque (assist control amount) $T_{m,md}$ that is a target value of an assist torque necessary for manual steering. The assist controller 41 sets the target assist torque $T_{m,md}$ based on the torsion bar torque $T_{tb}$ detected by the torque sensor 12. A setting example of the target assist torque $T_{m,md}$ with respect to the torsion bar torque $T_{tb}$ is shown in FIG. 3.

The target assist torque $T_{m,md}$ is made a positive value when a steering assisting force for left direction steering is to be generated from the electric motor 18 and is made a negative value when a steering assisting force for right direction steering is to be generated from the electric motor 18. The target assist torque $T_{m,md}$ is positive for a positive value of the torsion bar torque $T_{tb}$ and is negative for a negative value of the torsion bar torque $T_{tb}$. Also, the target assist torque $T_{m,md}$ is set such that its absolute value becomes greater as an absolute value of the torsion bar torque $T_{tb}$ becomes greater.

Also, the assist controller 41 may calculate the target assist torque $T_{m,md}$ by multiplying the torsion bar torque $T_{tb}$ by a constant set in advance.

Returning to FIG. 2, the automatic steering controller 42 uses the target automatic steering angle $\theta_{c,cmda}$ provided from the host ECU 201 and an actual automatic steering angle $\theta_{c,ad}$ to be described below to set a target automatic steering torque (automatic steering control amount) $T_{m,ad}$ necessary for automatic steering. Details of the automatic steering controller 42 shall be described below.

The integrated torque calculating portion 43 adds the target automatic steering torque $T_{m,ad}$ to the target assist torque $T_{m,md}$ to calculate a target integrated torque (integrated control amount) $T_{m,ma}$.

The torque controller 44 drives the drive circuit such that the motor torque of the electric motor 18 approaches the target integrated torque $T_{m,ma}$. Details of the torque controller 44 shall be described below.

The actual steering angle calculating portion 45 calculates a rotation angle $\theta_{c,ma}$ of the output shaft 9 based on the output signal of the rotation angle sensor 23. Specifically, the actual steering angle calculating portion 45 includes a rotation angle calculating portion 45A and a speed reduction ratio divider 45B. The rotation angle calculating portion 45A calculates a rotor rotation angle $\theta_{m,ma}$ of the electric motor 18 based on the output signal of the rotation angle sensor 23. The speed reduction ratio divider 45B divides the rotor rotation angle $\theta_{m,ma}$ calculated by the rotation angle calculating portion 45A by the speed reduction ratio N of the speed reducer 19 to convert the rotor rotation angle $\theta_{m,ma}$ to the rotation angle (actual steering angle) $\theta_{c,ma}$ of the output shaft 9.

The actual steering angle $\theta_{c,ma}$ includes a steering angle corresponding to manual steering based on the torsion bar torque $T_{tb}$ and the target assist torque $T_{m,md}$ (hereinafter referred to as the actual manual steering angle $\theta_{c,md}$) and a steering angle corresponding to automatic steering based on the target automatic steering torque $T_{m,ad}$ (hereinafter referred to as the actual automatic steering angle $\theta_{c,ad}$).

The actual automatic steering angle calculating portion 46 calculates the actual automatic steering angle $\theta_{c,ad}$ based on the torsion bar torque $T_{tb}$ and the target assist torque $T_{m,md}$, and the actual steering angle $\theta_{c,ma}$. Specifically, the actual automatic steering angle calculating portion 46 includes an actual manual steering angle calculating portion 46A and a subtractor 46B. The actual manual steering angle calculating portion 46A calculates the actual manual steering angle $\theta_{c,md}$. In the present preferred embodiment, the actual manual steering angle calculating portion 46A uses a reference model of the electric power steering system 1 (reference EPS model) to calculate the actual manual steering angle $\theta_{c,md}$.

Figure 4:
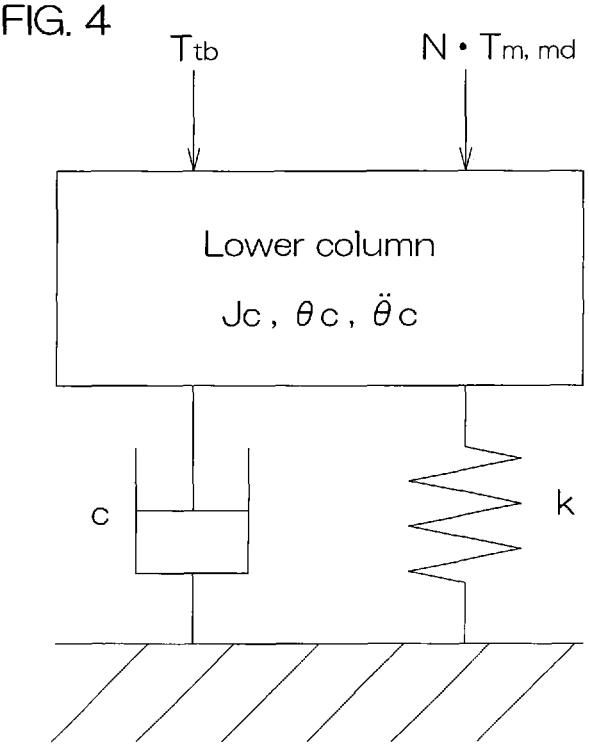
FIG. 4 is a schematic diagram of an example of a reference EPS model used in an actual manual steering angle calculating portion.

FIG. 4 is a schematic diagram of an example of the reference EPS model used in the actual manual steering angle calculating portion 46A.

The reference EPS model is a single inertia model that includes a lower column. The lower column corresponds to the output shaft 9 and the worm wheel 21. In FIG. 4, $J_c$ is an inertia of the lower column, $\theta_c$ is a rotation angle of the lower column, and $T_{tb}$ is the torsion bar torque. The reference EPS model is a model arranged to generate (estimate) the rotation angle $\theta_c$ of the lower column when the lower column is provided with the torsion bar torque $T_{tb}$, a torque $N \cdot T_{m,md}$ that acts on the output shaft 9 from the electric motor 18 based on the target assist torque $T_{m,md}$, and the road surface load torque $T_{rl}$. The road surface load torque $T_{rl}$ is expressed by the following formula (1) using a spring constant k and a viscous damping coefficient c.

$$T_{rl} = -k \cdot \theta_c - c(d\theta c/dt) \tag{1}$$

As the spring constant k and the viscous damping coefficient c in the present preferred embodiment, predetermined values determined in advance by experiment, analysis, etc., are set.

An equation of motion of the reference EPS model is expressed by the following formula (2).

$$J_c \cdot d^2\theta_c/dt^2 = T_{tb} + N \cdot T_{m,md} - k \cdot \theta_c - c(d\theta_c/dt) \quad (2)$$

The actual manual steering angle calculating portion 46A solves the differential equation of formula (2) to calculate the rotation angle $\theta_c$ of the lower column and sets the obtained rotation angle $\theta_c$ as the actual manual steering angle $\theta_{c,md}$.

Returning to FIG. 2, the subtractor 46B subtracts the actual manual steering angle $\theta_{c,md}$ calculated by the actual manual steering angle calculating portion 46A from the actual steering angle $\theta_{c,ma}$ calculated by the actual steering angle calculating portion 45 to calculate the actual automatic steering angle $\theta_{c,ad}$. The actual automatic steering angle $\theta_{c,ad}$ is provided to the automatic steering controller 42.

The automatic steering controller 42 and the torque controller 44 shall now be described in detail. First, the automatic steering controller 42 shall be described.

Figure 5:
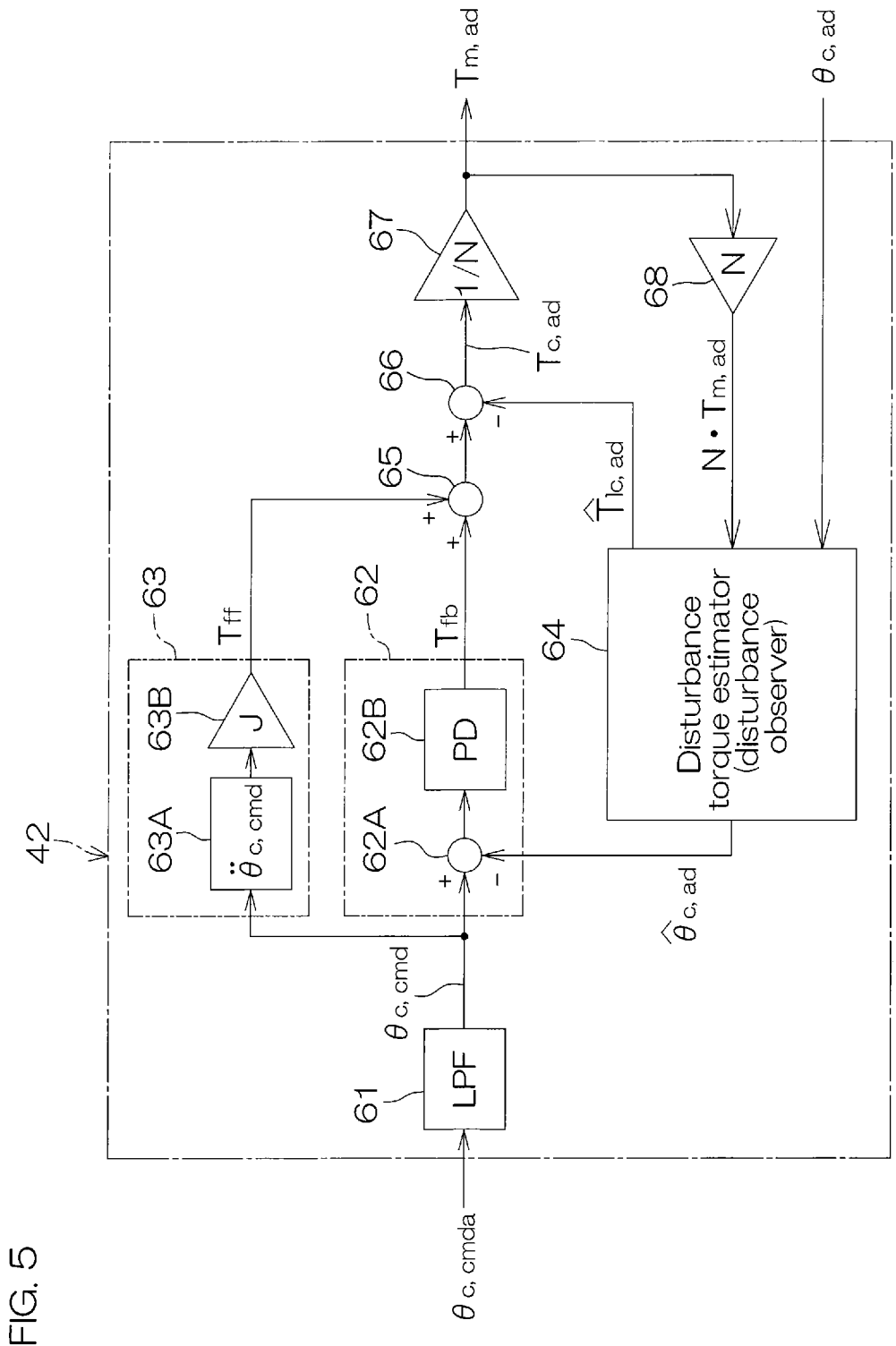
FIG. 5 is a block diagram of the arrangement of an automatic steering controller.

FIG. 5 is a block diagram of the arrangement of the automatic steering controller 42.

The automatic steering controller 42 uses the target automatic steering angle $\theta_{c,cmda}$ and the actual automatic steering angle $\theta_{c,ad}$ to calculate the target automatic steering torque $T_{m,ad}$. The automatic steering controller 42 includes a low-pass filter (LPF) 61, a feedback controller 62, a feedforward controller 63, a disturbance torque estimator 64, a torque adder 65, a disturbance torque compensator 66, a first speed reduction ratio divider 67, and a speed reduction ratio multiplier 68.

The speed reduction ratio multiplier 68 multiplies the target automatic steering torque $T_{m,ad}$ calculated by the first speed reduction ratio divider 67 by the speed reduction ratio N of the speed reducer 19 to convert the target automatic steering torque $T_{m,ad}$ to a target automatic output shaft torque $N \cdot T_{m,ad}$ that acts on the output shaft 9 (worm wheel 21).

The low-pass filter 61 performs a low-pass filter process on the target automatic steering angle $\theta_{c,cmda}$. The target automatic steering angle $\theta_{c,cmd}$ after the low-pass filter process is provided to the feedback controller 62 and the feedforward controller 63.

The feedback controller 62 is provided to bring an actual automatic steering angle estimate $\hat{\theta}_{c,ad}$ calculated by the disturbance torque estimator 64 close to the target automatic steering angle $\theta_{c,cmd}$ after the low-pass filter process. The feedback controller 62 includes an angular deviation calculating portion 62A and a PD controller 62B. The angular deviation calculating portion 62A calculates a deviation $\Delta\theta_c$ ($=\theta_{c,cmd} - \hat{\theta}_{c,ad}$) between the target automatic steering angle $\theta_{c,cmd}$ and the actual automatic steering angle estimate $\hat{\theta}_{c,ad}$. Also, the angular deviation calculating portion 62A may calculate a deviation ($\theta_{c,cmd} - \theta_{c,ad}$) between the target automatic steering angle $\theta_{c,cmd}$ and the actual automatic steering angle $\theta_{c,ad}$ calculated by the actual automatic steering angle calculating portion 46 (see FIG. 2) as the angular deviation $\Delta\theta_c$.

The PD controller 62B calculates a feedback control torque $T_{fb}$ by performing PD calculation (proportional differential calculation) on the angular deviation $\Delta\theta_c$ calculated by the angular deviation calculating portion 62A. The feedback control torque $T_{fb}$ is provided to the torque adder 65.

The feedforward controller 63 is provided to improve responsiveness of control by compensating for a delay in responsiveness of the electric power steering system 1 due to inertia. The feedforward controller 63 includes an angular acceleration calculating portion 63A and an inertia multi-plier 63B. The angular acceleration calculating portion 63A performs second order differentiation of the target automatic steering angle $\theta_{c,cmd}$ to calculate a target angular acceleration $d^2\theta_{c,cmd}/dt^2$.

The inertia multiplier 63B multiplies the target angular acceleration $d^2\theta_{c,cmd}/dt^2$ calculated by the angular acceleration calculating portion 63A by an inertia J of the electric power steering system 1 to calculate a feedforward control torque $T_{ff}$ ($=J \cdot d^2\theta_{c,cmd}/dt^2$). The inertia J is determined, for example, from a physical model (see FIG. 6) of the electric power steering system 1 to be described below. The feedforward control torque $T_{ff}$ is provided as an inertial compensation value to the torque adder 65.

The torque adder 65 adds the feedforward control torque $T_{ff}$ to the feedback control torque $T_{fb}$ to calculate a target basic torque ($T_{fb} + T_{ff}$).

The disturbance torque estimator 64 is mainly provided to calculate an automatic disturbance torque estimate $\hat{T}_{lc,ad}$ that is an estimate of a disturbance torque $T_{lc,ad}$ corresponding to the automatic steering and included in the disturbance torque $T_{lc}$ besides the motor torque that acts on the driven object of the electric motor 18. The disturbance torque $T_{lc,ad}$ corresponding to the automatic steering refers to a torque besides the motor torque that is generated as a disturbance in the driven object (plant) of the electric motor 18 when it is assumed that just the automatic steering control based on the target automatic steering torque $T_{m,ad}$ is being performed.

When it is assumed that just the automatic steering control based on the target automatic steering torque $T_{m,ad}$ is being performed, a target value of the plant becomes the target automatic output shaft torque $N \cdot T_{m,ad}$ ($=T_{c,ad}$) and an output of the plant becomes the actual automatic steering angle $\theta_{c,ad}$. The disturbance torque estimator 64 thus estimates the automatic disturbance torque $T_{lc,ad}$, the actual automatic steering angle $\theta_{c,ad}$, and a derivative (angular speed) $d\theta_{c,ad}/dt$ of the actual automatic steering angle $\theta_{c,ad}$ based on the target automatic output shaft torque $N \cdot T_{m,ad}$ ($=T_{c,ad}$) and the actual automatic steering angle $\theta_{c,ad}$. In the following description, the estimates of $T_{lc,ad}$, $\theta_{c,ad}$, and $d\theta_{c,ad}/dt$ shall be represented by $\hat{T}_{lc,ad}$, $\hat{\theta}_{c,ad}$, and $\hat{d\theta}_{c,ad}/dt$, respectively. Details of the disturbance torque estimator 64 shall be described below.

The automatic disturbance torque estimate $\hat{T}_{lc,ad}$ calculated by the disturbance torque estimator 64 is provided as an automatic disturbance torque compensation value to the disturbance torque compensator 66. The actual automatic steering angle estimate $\hat{\theta}_{c,ad}$ calculated by the disturbance torque estimator 64 is provided to the angular deviation calculating portion 62A.

The disturbance torque compensator 66 subtracts the automatic disturbance torque estimate $\hat{T}_{lc,ad}$ from the target basic torque ($T_{fb} + T_{ff}$) to calculate the target automatic output shaft torque $T_{c,ad}$ ($=T_{fb} + T_{ff} - \hat{T}_{lc,ad}$). The target automatic output shaft torque $T_{c,ad}$ compensated for the automatic disturbance torque (target torque for the output shaft 9) is thereby obtained.

The target automatic output shaft torque $T_{c,ad}$ is provided to the first speed reduction ratio divider 67. The first speed reduction ratio divider 67 divides the target automatic output shaft torque $T_{c,ad}$ by the speed reduction ratio N to calculate the target automatic steering torque $T_{m,ad}$ (target torque for the electric motor 18). The target automatic steering torque $T_{m,ad}$ is provided to the integrated torque calculating portion 43 (see FIG. 2).

Figure 6:
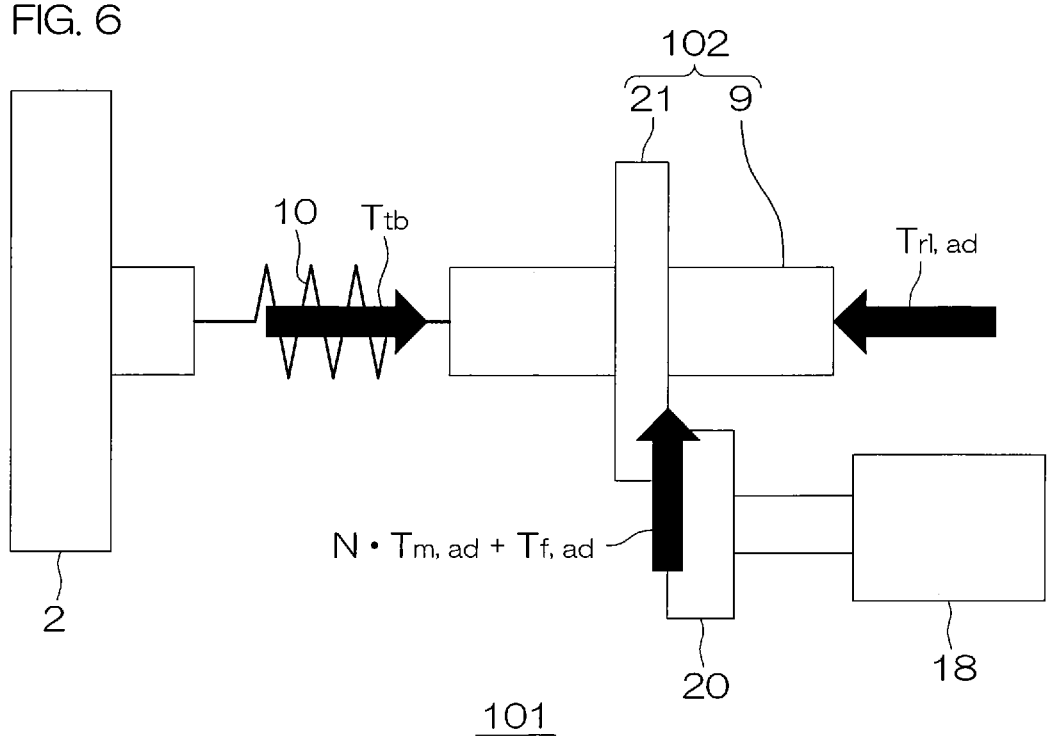
FIG. 6 is a schematic diagram of an arrangement example of a physical model of the electric power steering system.

The disturbance torque estimator 64 shall now be described in detail. The disturbance torque estimator 64 is arranged from a disturbance observer that uses, for example, a physical model 101 of the electric power steering system 1 shown in FIG. 6 to calculate the automatic disturbance torque estimate $\hat{T}_{lc,ad}$, the actual automatic steering angle estimate $\hat{\theta}_{c,ad}$, and the angular speed estimate $\hat{d\theta}_{c,ad}/dt$. However, FIG. 6 shows the physical model for a case where it is assumed that just the automatic steering control based on the target automatic steering torque $T_{m,ad}$ is being performed.

The physical model 101 includes a plant (example of a motor driven object) 102 that includes the output shaft 9 and the worm wheel 21 fixed to the output shaft 9. To the plant 102, the torsion bar torque $T_{tb}$ that is a torsion torque of the torsion bar 10 is applied and the road surface load torque $T_{rl,ad}$ is applied from the turned wheels 3 side. Further, to the plant 102, the target automatic output shaft torque $N \cdot T_{m,ad}$ from the motor is applied via the worm gear 20 and a friction torque $T_{f,ad}$ is applied due to friction between the worm wheel 21 and the worm gear 20.

If an inertia of the plant 102 is J, an equation of motion regarding the inertia of the physical model 101 is expressed by the following formula (3).

[Numerical Formula 1]

Numerical Formula 1

$$J\ddot{\theta}_{c,ad} = N \cdot T_{m,ad} + T_{lc,ad}$$

$$T_{lc,ad} = T_{tb} + T_{rl,ad} + T_{f,ad} \quad (3)$$

$d^2\theta_{c,ad}/dt^2$ is an angular acceleration of the plant 102. N is the speed reduction ratio of the speed reducer 19. $T_{lc,ad}$ represents the automatic disturbance torque applied to the plant 102. Although in the present preferred embodiment, the automatic disturbance torque $T_{lc,ad}$ is represented as a sum of the torsion bar torque $T_{tb}$, the road surface load torque $T_{rl,ad}$, and the friction torque $T_{f,ad}$, the automatic disturbance torque $T_{lc,ad}$ actually includes torques besides these.

An equation of state for the physical model 101 of FIG. 6 is expressed by the following formula (4).

Numerical Formula 2

$$\begin{cases} \dot{x} = Ax + B1u1 + B2u2 \\ y = Cx + Du1 \end{cases} \quad (4)$$

In the formula (4), x is a state variable vector. In the formula (4), u1 is a known input vector. In the formula (4), u2 is an unknown input vector. In the formula (4), y is an output vector. In the formula (4), A is a system matrix. In the formula (4), B1 is a first input matrix. In the formula (4), B2 is a second input matrix. In the formula (4), C is an output matrix. In the formula (4), D is a feed-through matrix.

The equation of state is extended to a system that includes the unknown input vector u2 as one state. An equation of state of the extended system (extended equation of state) is expressed by the following formula (5).

Numerical Formula 3

$$\begin{cases} \dot{x}_e = A_e x_e + B_e u1 \\ y = C_e x_e \end{cases} \quad (5)$$

In the formula (5), $x_e$ is a state variable vector of the extended system and is expressed by the following formula (6).

Numerical Formula 4

$$x_e = \begin{bmatrix} x \\ u2 \end{bmatrix} \quad (6)$$

In the formula (5), $A_e$ is a system matrix of the extended system. In the formula (5), $B_e$ is a known input matrix of the extended system. In the formula (5), $C_e$ is an output matrix of the extended system.

From the extended equation of state of the formula (5), a disturbance observer (extended state observer) expressed by the equation of the following formula (7) is constructed.

Numerical Formula 5

$$\begin{cases} \dot{\hat{x}}_e = A_e \hat{x}_e + B_e u1 + L(y - \hat{y}) \\ \hat{y} = C_e \hat{x}_e \end{cases} \quad (7)$$

In the formula (7), $\hat{x}_e$ represents an estimate of $x_e$. Also, L is an observer gain. Also, $\hat{y}$ represents an estimate of y. $\hat{x}_e$ is expressed by the following formula (8).

Numerical Formula 6

$$\hat{x}_e = \begin{bmatrix} \hat{\theta}_{c,ad} \\ \hat{\dot{\theta}}_{c,ad} \\ \hat{T}_{lc,ad} \end{bmatrix} \quad (8)$$

In the formula (8), $\hat{\theta}_{c,ad}$ is an estimate of the actual automatic steering angle $\theta_{c,ad}$, $\hat{d\theta}_{c,ad}/dt$ is an estimate of the angular speed $d\theta_{c,ad}/dt$, and $\hat{T}_{lc,ad}$ is an estimate of the automatic disturbance torque $T_{lc,ad}$.

The disturbance torque estimator 64 calculates a state variable vector $\hat{x}_e$ based on the equation of the formula (7).

Figure 7:
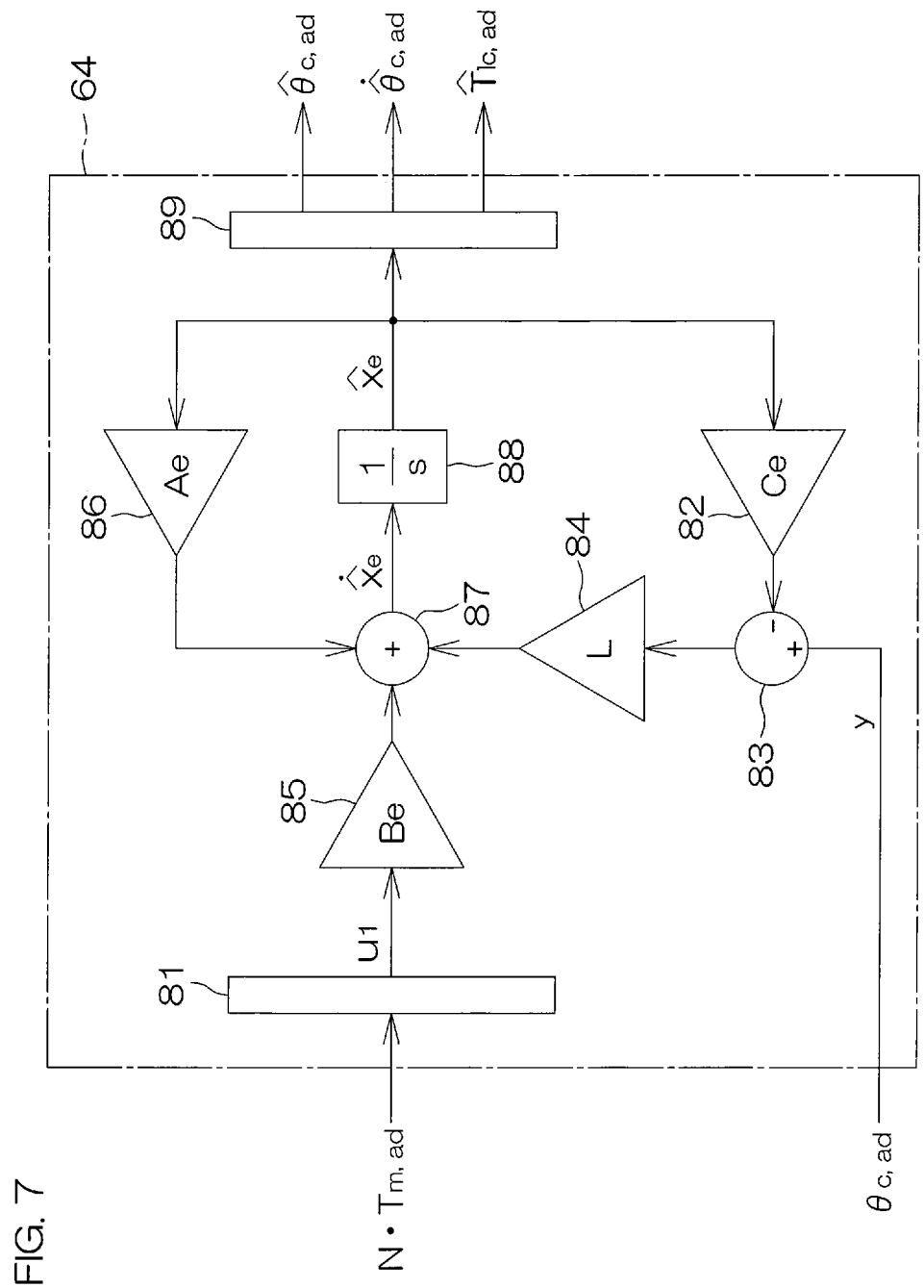
FIG. 7 is a block diagram of the arrangement of a disturbance torque estimator.

FIG. 7 is a block diagram of the arrangement of the disturbance torque estimator 64.

The disturbance torque estimator 64 includes an input vector inputting portion 81, an output matrix multiplier 82, a first adder 83, a gain multiplier 84, an input matrix multiplier 85, a system matrix multiplier 86, a second adder 87, an integrator 88, and a state variable vector outputting portion 89.

The target automatic output shaft torque $N \cdot T_{m,ad}$ (=$T_{c,ad}$) calculated by the speed reduction ratio multiplier 68 (see FIG. 5) is provided to the input vector inputting portion 81. The input vector inputting portion 81 outputs the input vector u1.

The output of the integrator 88 becomes the state variable vector $\hat{x}_e$ (see the formula (8)). At a start of calculation, an initial value is provided as the state variable vector $\hat{x}_e$. The initial value of the state variable vector $\hat{x}_e$ is, for example, 0.

The system matrix multiplier 86 multiplies the state variable vector $\hat{x}_e$ by the system matrix $A_e$. The output matrix multiplier 82 multiplies the state variable vector $\hat{x}_e$ by the output matrix $C_e$.

The first adder 83 subtracts the output of the output matrix multiplier 82 ($C_e \cdot \hat{x}_e$) from the output vector y that is the actual automatic steering angle $\theta_{c,ad}$. That is, the first adder 83 calculates a difference (y−$\hat{y}$) between the output vector y and the output vector estimate $\hat{y}$ (=$C_e \cdot \hat{x}_e$). The gain multiplier 84 multiplies the output of the first adder 83 (y−$\hat{y}$) by the observer gain L (see the formula (7)).

The input matrix multiplier 85 multiplies the input vector u1 output from the input vector inputting portion 81 by the input matrix $B_e$. The second adder 87 adds the output of the input matrix multiplier 85 ($B_e \cdot u1$), the output of the system matrix multiplier 86 ($A_e \cdot \hat{x}_e$), and the output of the gain multiplier 84 ($L(y-\hat{y})$) to calculate a derivative $d\hat{x}_e/dt$ of the state variable vector. The integrator 88 integrates the output of the second adder 87 ($d\hat{x}_e/dt$) to calculate the state variable vector $\hat{x}_e$. Based on the state variable vector $\hat{x}_e$, the state variable vector outputting portion 89 calculates the automatic disturbance torque estimate $\hat{T}_{lc,ad}$, the actual automatic steering angle estimate $\hat{\theta}_{c,ad}$, and the angular speed estimate $d\hat{\theta}_{c,ad}/dt$.

A disturbance observer arranged from an inverse model of the plant and a low-pass filter may be used in place of the extended state observer described above. The equation of motion of the plant in this case is expressed by the formula (3) as mentioned above.

Therefore, an inverse model of the plant is the following formula (9).

[Numerical Formula 7]

Numerical Formula 7

$$T_{lc,ad} = J\ddot{\theta}_{c,ad} - N \cdot T_{m,ad} \qquad (9)$$

The disturbance observer using the inverse model of the plant has $J \cdot d^2\theta_{c,ad}/dt^2$ and $N \cdot T_{m,ad}$ as inputs and, due to using the second order derivative of the actual steering angle θ, is greatly influenced by noise of the rotation angle sensor 23. On the other hand, the extended state observer described above estimates the disturbance torque as an integral type and therefore has an advantage of being capable of reducing influence of noise due to differentiation.

The torque controller 44 shall now be described.

Figure 8:
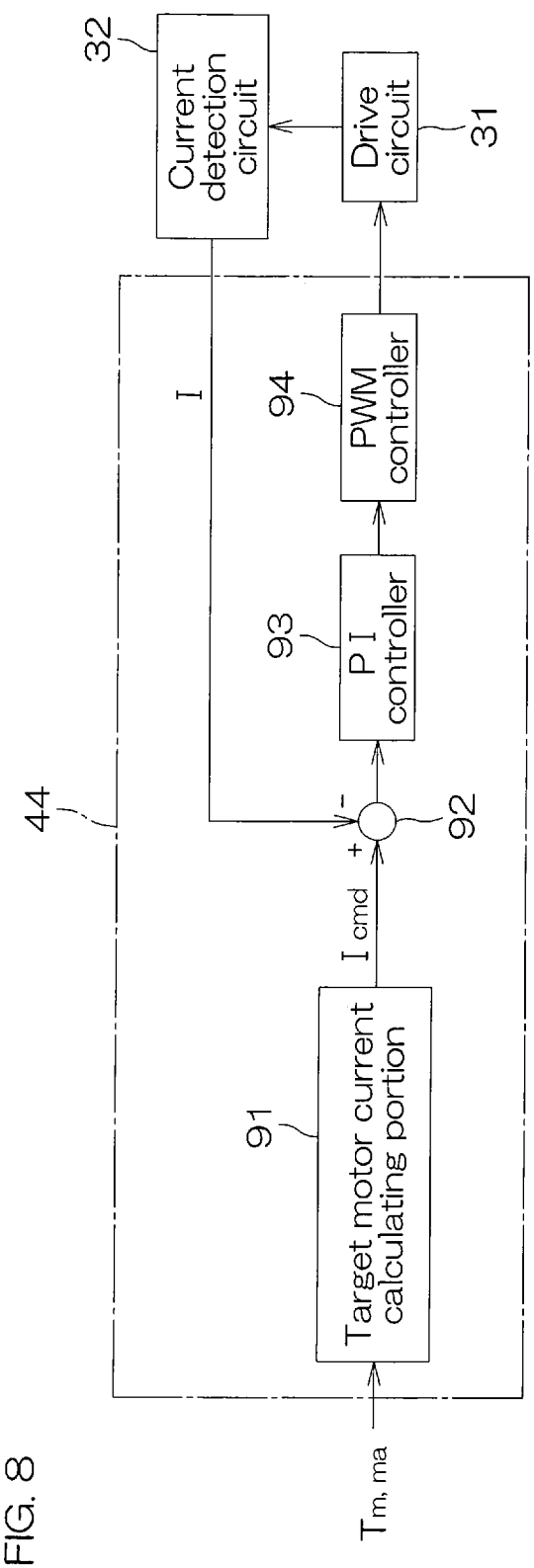
FIG. 8 is a block diagram of the arrangement of a torque controller.

FIG. 8 is a block diagram of the arrangement of the torque controller 44.

The torque controller 44 (see FIG. 2) includes a target motor current calculating portion 91, a current deviation calculating portion 92, a PI controller 93, and a PWM (pulse width modulation) controller 94.

The target motor current calculating portion 91 divides the target integrated torque $T_{m,ma}$ calculated by the integrated torque calculating portion 43 (see FIG. 2) by a torque constant $K_t$ of the electric motor 18 to calculate a target motor current $I_{cmd}$.

The current deviation calculating portion 92 calculates a deviation $\Delta I (=I_{cmd}-I)$ between the target motor current $I_{cmd}$ obtained by the target motor current calculating portion 91 and the motor current I detected by the current detection circuit 32.

The PI controller 93 performs PI calculation (proportional integral calculation) on the current deviation $\Delta I$ calculated by the current deviation calculating portion 92 to generate a drive command value for bringing the motor current I flowing through the electric motor 18 close to the target motor current $I_{cmd}$. The PWM controller 94 generates a PWM control signal with a duty ratio corresponding to the drive command value and supplies the signal to the drive circuit 31. Power corresponding to the drive command value is thereby arranged to be supplied to the electric motor 18.

With the preferred embodiment described above, the actual automatic steering angle $\theta_{c,ad}$ that is the steering angle due to the automatic steering control and included in the actual steering angle $\theta_{c,ma}$ is calculated by the actual automatic steering angle calculating portion 46. The steering angle based on the manual steering (steering angle due to the manual steering and assist control) is not included in the actual automatic steering angle $\theta_{c,ad}$ used in setting the target automatic steering torque $T_{m,ad}$ (automatic steering control amount) and therefore, even when the manual steering is performed during the automatic steering control, a proper automatic steering control amount is set and performing of appropriate automatic steering control is enabled.

Also, by controlling the electric motor 18 based on the target integrated torque $T_{m,ma}$ that is calculated by adding the target assist torque $T_{m,md}$ to the target automatic steering torque $T_{m,ad}$, it is possible to realize the assist control that is in accordance with the manual steering while performing steering control mainly by the automatic steering control. Coexistence of the automatic steering control and the assist control in accordance with the manual steering is thereby made possible and seamless transition between the two is enabled.

Also, with the preferred embodiment described above, the disturbance torque estimator 64 calculates the estimate $\hat{T}_{lc,ad}$ of the automatic disturbance torque $T_{lc,ad}$ based on the target automatic output shaft torque $T_{c,ad}$ ($N \cdot T_{m,ad}$) and the actual automatic steering angle $\theta_{c,ad}$. The disturbance torque compensator 66 then uses the estimate $\hat{T}_{lc,ad}$ to correct the target basic torque ($T_{fb}+T_{ff}$). That is, the automatic steering controller 42 compensates for the disturbance torque corresponding to the automatic steering but does not compensate for the torque that gives rise to the actual manual steering angle $\theta_{c,md}$. It is thereby made possible to perform the assist control in accordance with the manual steering even during the automatic steering control.

Thus, with the preferred embodiment described above, the assist control in accordance with the manual steering and the automatic steering control are enabled to operate in the same system at the same time without influencing stability and operation of each other.

Figure 9:
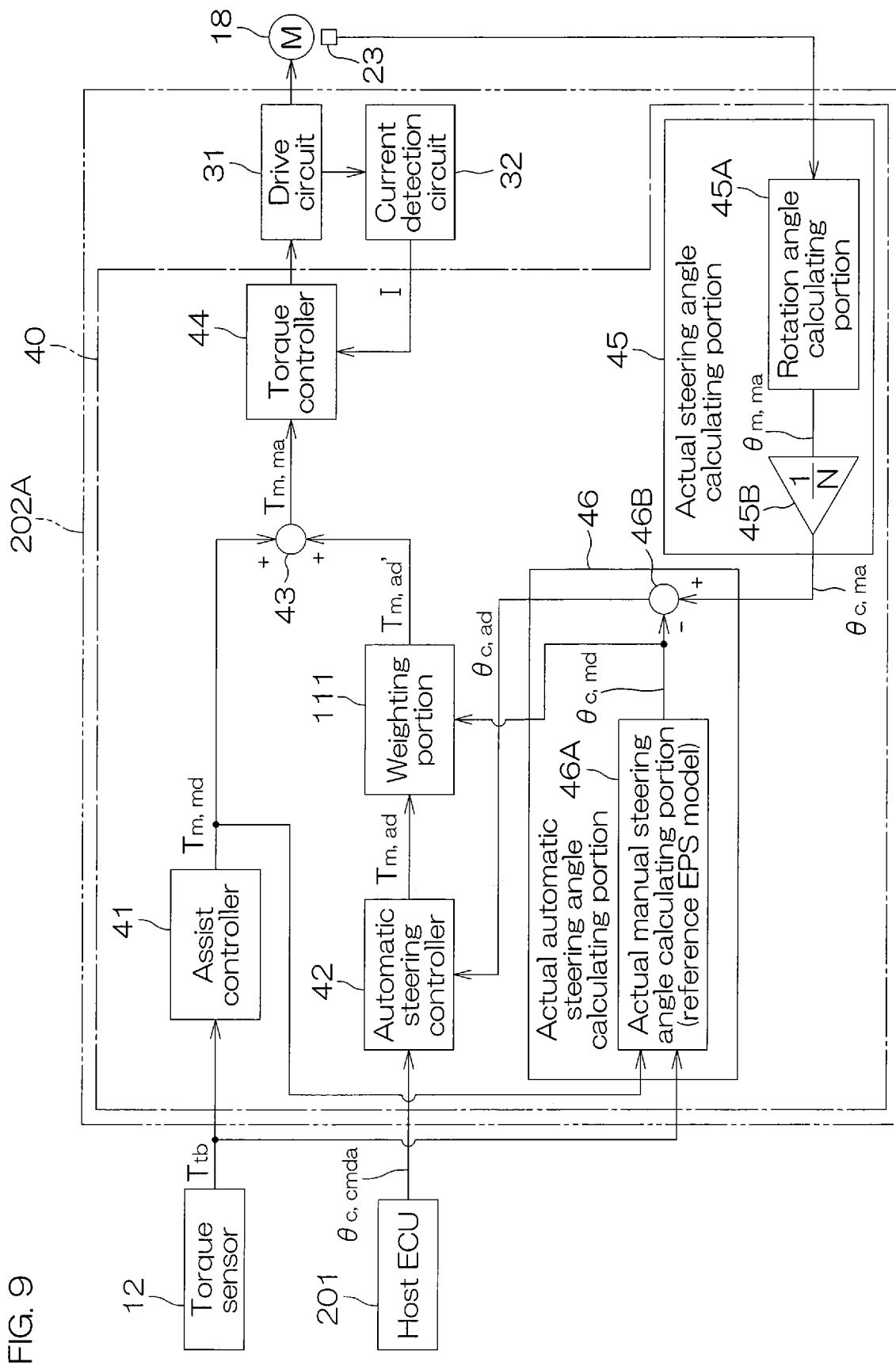
FIG. 9 is a block diagram of a first modification example of the motor controlling ECU.

FIG. 9 is a block diagram of a first modification example of the motor controlling ECU. In FIG. 9, portions corresponding to respective portions of FIG. 2 described above are indicated with the same symbols attached as in FIG. 2.

In the following description, a steering mode in which the electric motor 18 is controlled based just on the target automatic steering torque $T_{m,ad}$ shall be referred to as the automatic steering mode and a steering mode in which the electric motor 18 is controlled based just on the target assist torque $T_{m,md}$ shall be referred to as the manual steering mode.

A motor controlling ECU 202A of FIG. 9 differs from the motor controlling ECU 202 of FIG. 2 in being provided with a weighting portion 111 that performs a weighting process on the target automatic steering torque $T_{m,ad}$ set by the automatic steering controller 42. The weighting portion 111 is an example of a "first weighting portion of the present invention."

The weighting portion 111 is provided between the automatic steering controller 42 and the integrated torque calculating portion 43. The weighting portion 111 performs the weighting process on the target automatic steering torque $T_{m,ad}$ in accordance with the actual manual steering angle $\theta_{c,md}$ calculated by the actual manual steering angle calculating portion 46A.

Specifically, the weighting portion 111 sets a weight $W_{ad}$ based on the actual manual steering angle $\theta_{c,md}$ and thereafter multiplies the target automatic steering torque $T_{m,ad}$ set by the automatic steering controller 42 by the weight $W_{ad}$. The weighting portion 111 then provides the product value $W_{ad} \cdot T_{m,ad}$ as the target automatic steering torque $T_{m,ad}'$ after the weighting process to the integrated torque calculating portion 43.

The integrated torque calculating portion 43 calculates the target integrated torque $T_{m,ma}$ by adding the target automatic steering torque $T_{m,ad}'$ after the weighting process by the weighting portion 111 to the target assist torque $T_{m,md}$ set by the assist controller 41.

Figure 10:
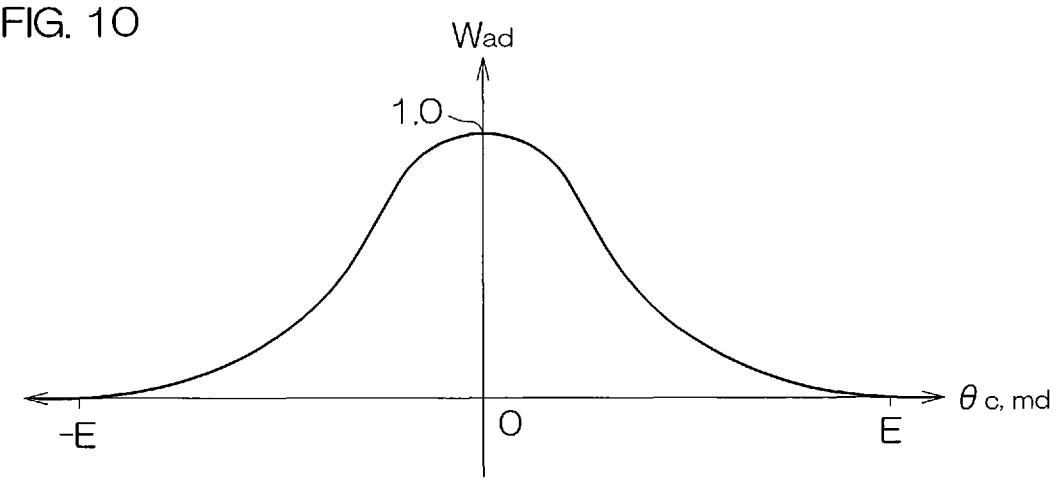
FIG. 10 is a graph of a setting example of a weight $W_{ad}$ with respect to an actual manual steering angle $\theta_{c,md}$.

The weight $W_{ad}$ set by the weighting portion 111 shall now be described. A setting example of the weight $W_{ad}$ with respect to the actual manual steering angle $\theta_{c,md}$ is shown in FIG. 10. The weight $W_{ad}$ is set to a value within a range of 0 to 1.0 in accordance with the actual manual steering angle $\theta_{c,md}$. The weight $W_{ad}$ is set to 1.0 when the actual manual steering angle $\theta_{c,md}$ is zero. Also, the weight $W_{ad}$ is set to zero when an absolute value of the actual manual steering angle $\theta_{c,md}$ is not less than a predetermined value E (where, E>0). Also, within a range in which the absolute value of the actual manual steering angle $\theta_{c,md}$ is 0 to E, the weight $W_{ad}$ is set such as to decrease gradually nonlinearly as the absolute value of the actual manual steering angle $\theta_{c,md}$ increases and to increase gradually nonlinearly as the absolute value of the actual manual steering angle $\theta_{c,md}$ decreases. The predetermined value E is set in advance by experiment, analysis, etc.

Also, the weight $W_{ad}$ may instead be set such as to decrease gradually linearly as the absolute value of the actual manual steering angle $\theta_{c,md}$ increases and to increase gradually linearly as the absolute value of the actual manual steering angle $\theta_{c,md}$ decreases within the range in which the absolute value of the actual manual steering angle $\theta_{c,md}$ is 0 to E.

With the motor controlling ECU 202A, the target automatic steering torque $T_{m,ad}$ set by the automatic steering controller 42 is provided as it is to the integrated torque calculating portion 43 when the actual manual steering angle $\theta_{c,md}$ is zero. When the actual manual steering angle $\theta_{c,md}$ is zero, it is considered that the target assist torque $T_{m,md}$ is substantially zero. Therefore, when the actual manual steering angle $\theta_{c,md}$ is zero, the electric motor 18 is controlled practically based just on the target automatic steering torque $T_{m,ad}$ and therefore the steering mode is the automatic steering mode.

On the other hand, when the absolute value of the actual manual steering angle $\theta_{c,md}$ is not less than the predetermined value E, the target automatic steering torque $T_{m,ad}$ becomes zero. In this case, the electric motor 18 is controlled based just on the target assist torque $T_{m,md}$ and the steering mode is the manual steering mode.

That is, with the motor controlling ECU 202A, the steering mode is enabled to be set to the automatic steering mode in which the electric motor 18 is controlled based just on the target automatic steering torque $T_{m,ad}$ or set to the manual steering mode in which the electric motor 18 is controlled based just on the target assist torque $T_{m,md}$. Switching between the automatic steering mode and the manual steering mode is performed based on the actual manual steering angle $\theta_{c,md}$ that is calculated using the torsion bar torque $T_{tb}$ and the target assist torque $T_{m,md}$ and it is therefore possible to perform switching between the steering modes by steering wheel operation by the driver.

Also, when switching from the automatic steering mode to the manual steering mode, the absolute value of the target automatic steering torque $T_{m,ad}$ is gradually decreased to zero, and when switching from the manual steering mode to the automatic steering mode, the absolute value of the target automatic steering torque $T_{m,ad}$ is gradually increased from zero. Thus, with the motor controlling ECU 202A, it is possible to perform the switching between the automatic steering mode and the manual steering mode smoothly.

Although with the first modification example, the weighting process is performed on the target automatic steering torque $T_{m,ad}$ in accordance with the actual manual steering angle $\theta_{c,md}$, the present invention is not restricted to such an embodiment. For example, a weighting process may be performed on the target automatic steering torque $T_{m,ad}$ in accordance with the torsion bar torque $T_{tb}$. Specifically, it is possible to exhibit the same effect as the first modification example by inputting the torsion bar torque $T_{tb}$ detected by the torque sensor 12 into the weighting portion 111 and setting the weight $W_{ad}$ from a graph where the abscissa of FIG. 10 is the torsion bar torque $T_{tb}$.

Figure 11:
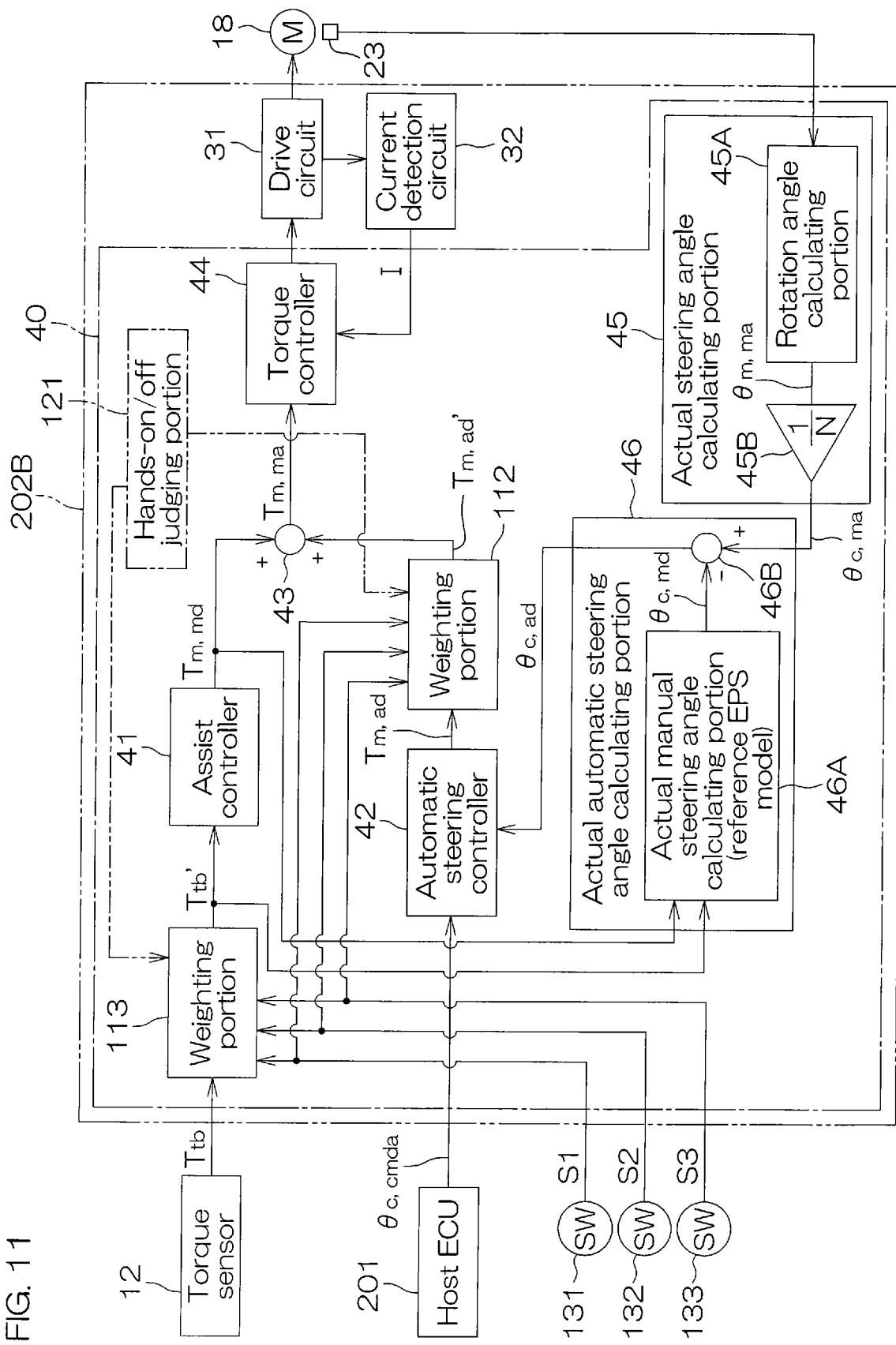
FIG. 11 is a block diagram of a second modification example of the motor controlling ECU.

FIG. 11 is a block diagram of a second modification example of the motor controlling ECU. In FIG. 11, portions corresponding to respective portions of FIG. 2 described above are indicated with the same symbols attached as in FIG. 2.

A motor controlling ECU 202B of FIG. 11 differs from the motor controlling ECU 202 of FIG. 2 in that mode setting signals are input from first, second, and third mode switches 131, 132, and 133 and in being provided with a first weighting portion 112 and a second weighting portion 113.

The first weighting portion 112 is an example of a "fifth weighting portion of the present invention" and the second weighting portion 113 is an example of a "sixth weighting portion of the present invention."

When turned on by the driver, the first mode switch 131 outputs a normal steering mode setting signal S1 for setting the steering mode to a normal steering mode. The normal steering mode is a mode in which the electric motor 18 is controlled based on the target assist torque $T_{m,md}$ and the target automatic steering torque $T_{m,ad}$ as is done by the motor controlling ECU 202 of FIG. 2.

When turned on by the driver, the second mode switch 132 outputs an automatic steering mode setting signal S2 for setting the steering mode to the automatic steering mode.

When turned on by the driver, the third mode switch 133 outputs a manual steering mode setting signal S3 for setting the steering mode to the manual steering mode.

Each of the mode setting signals S1, S2, and S3 are provided to the first and second weighting portions 112 and 113.

The first weighting portion 112 is provided between the automatic steering controller 42 and the integrated torque calculating portion 43. The first weighting portion 112 performs a weighting process on the target automatic steering torque $T_{m,ad}$ in accordance with the mode setting signal S1, S2, or S3 that is input.

Specifically, when any of the mode setting signals S1, S2, and S3 is input, the first weighting portion 112 first sets a first weight $W_{ad}$ in accordance with the current steering mode and the mode setting signal that has been input. Next, the first weighting portion 112 multiplies the target automatic steering torque $T_{m,ad}$ set by the automatic steering controller 42 by the first weight $W_{ad}$. The first weighting portion 112 then provides the product value $W_{ad} \cdot T_{m,ad}$ as the target automatic steering torque $T_{m,ad}'$ after the weighting process to the integrated torque calculating portion 43.

In accordance with the mode setting signal S1, S2, or S3 that is input, the second weighting portion 113 performs a weighting process on the torsion bar torque $T_{tb}$ detected by the torque sensor 12.

Specifically, when any of the mode setting signals S1, S2, and S3 is input, the second weighting portion 113 first sets a second weight $W_{md}$ in accordance with the current steering mode and the mode setting signal that has been input. Next, the second weighting portion 113 multiplies the torsion bar torque $T_{tb}$ detected by the torque sensor 12 by the second weight $W_{md}$. The second weighting portion 113 then provides the product value $W_{md} \cdot T_{tb}$ as the torsion bar torque $T_{tb}'$ after the weighting process to the assist controller 41 and the actual manual steering angle calculating portion 46A.

In the second modification example, the assist controller 41 sets the target assist torque $T_{m,md}$ based on the torsion bar torque $T_{tb}'$ after the second weighting process. Also, the actual automatic steering angle calculating portion 46 calculates the actual automatic steering angle $\theta_{c,ad}$ based on the torsion bar torque $T_{tb}'$ after the second weighting process, the target assist torque $T_{m,md}$ set by the assist controller 41, and the actual steering angle $\theta_{c,ma}$. Also, the automatic steering controller 42 sets the target automatic steering torque $T_{m,ad}$ using the target automatic steering angle $\theta_{c,cmda}$ and the actual automatic steering angle $\theta_{c,ad}$ calculated by the actual automatic steering angle calculating portion 46.

The integrated torque calculating portion 43 calculates the target integrated torque $T_{m,ma}$ by adding the target assist torque $T_{m,md}$ set by the assist controller 41 and the target automatic steering torque $T_{m,ad}'$ after the weighting process.

In the second modification example, when the steering mode set to the normal steering mode, the first weight $W_{ad}$ and the second weight $W_{md}$ are set to 1.0. When the steering mode is set to the automatic steering mode, the first weight $W_{ad}$ is set to 1.0 and the second weight $W_{md}$ is set to zero. When the steering mode is set to the manual steering mode, the first weight $W_{ad}$ is set to zero and the second weight $W_{md}$ is set to 1.0. That is, with the motor controlling ECU 202B, it is made possible to perform switching of the steering mode among the normal steering mode, the automatic steering mode, and the manual steering mode by operation of the mode switches 131, 132, and 133 by the driver.

Figure 12:
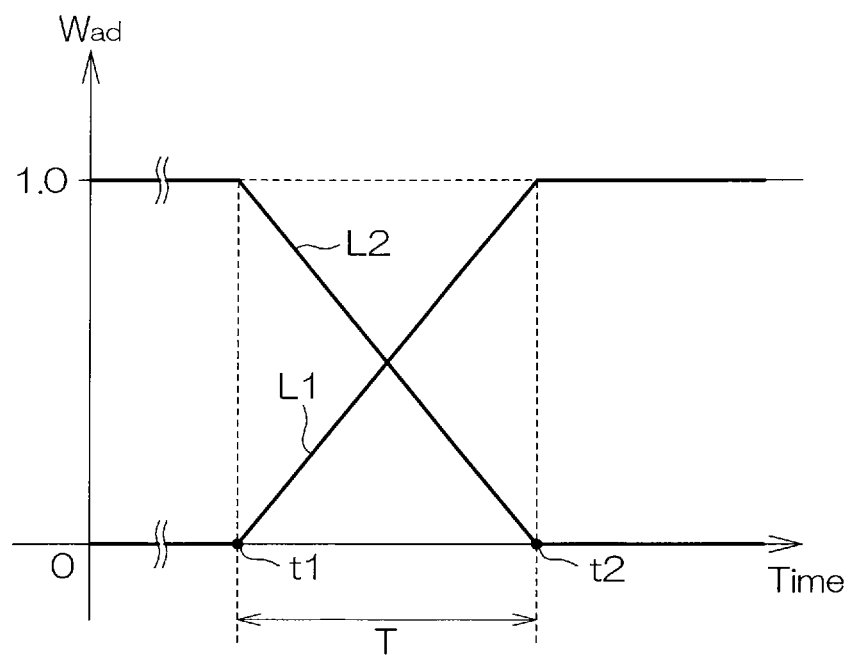
FIG. 12 is a graph of setting examples of a first weight $W_{ad}$ that is set when a mode setting signal S1, S2, or S3 is input.
Figure 13:
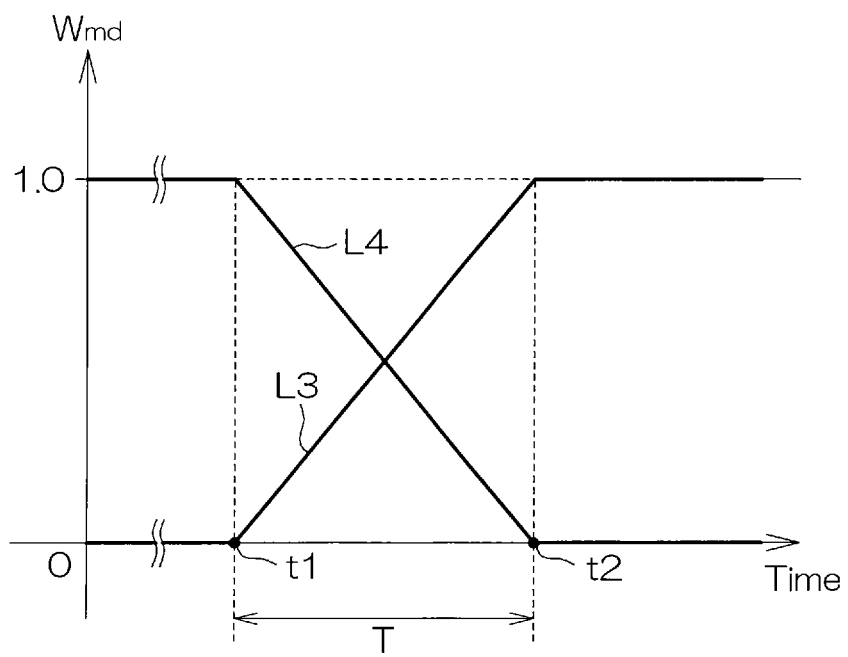
FIG. 13 is a graph of setting examples of second to fourth weights $W_{md}$ that are set when the mode setting signal S1, S2, or S3 is input.

Setting examples of the first weight $W_{ad}$ and the second weight $W_{md}$ in accompaniment with the switching of the steering mode are respectively shown in FIG. 12 and FIG. 13. In FIG. 12, from a time at which the mode setting signal S1, S2, or S3 is input (time t1) to a time t2 following the elapse of a predetermined time T, a state of gradual increase in the first weight $W_{ad}$ from zero to 1.0 is shown by a broken line L1 and a state of gradual decrease from 1.0 to zero is shown by a broken line L2. Also, in FIG. 13, from the time t1 to the time t2, a state of gradual increase in the second weight $W_{md}$ from zero to 1.0 is shown by a broken line L3 and a state of gradual decrease from 1.0 to zero is shown by a broken line L4. Thereby, respective absolute values of the target automatic steering torque $T_{m,ad}'$ after the weighting process and the torsion bar torque $T_{tb}'$ after the weighting process are increased gradually or decreased gradually and switching among the steering modes is performed smoothly.

As the time T required for the first weight $W_{ad}$ and the second weight $W_{md}$ to switch between zero and 1.0, a predetermined value determined in advance by experiment, analysis, etc., is set. Also, the time T required for switching between zero and 1.0 may be differed for the first weight $W_{ad}$ and the second weight $W_{md}$. Also, the first weight $W_{ad}$ and the second weight $W_{md}$ may be set such as to increase gradually and decrease gradually not linearly but nonlinearly instead.

In the second modification example (the same applies to a third modification example to be described below), even if an operation of the mode switch 131, 132, or 133 that does not accompany a change of the steering mode is performed, the operation is made ineffective. Also, in the second modification example (the same applies to a third modification example to be described below), even if, after the mode switch 131, 132, or 133 is operated, operation of any of the mode switches 131, 132, and 133 is performed before the predetermined time T elapses, that operation is made ineffective.

The automatic steering mode setting signal S2 or the manual steering mode setting signal S3 may be arranged to be generated in accordance with whether the driver has gripped or released the steering wheel 2. Specifically, a hands-on/off judging portion 121 arranged to judge whether the driver has gripped or released the steering wheel 2 is provided as indicated by alternate long and two short dashes lines in FIG. 11. As the hands-on/off judging portion 121, it is possible to use an arrangement that judges whether the driver has gripped or released the steering wheel 2 based on an output signal of touch sensor (not shown) provided in the steering wheel 2, an arrangement that judges whether the driver has gripped or released the steering wheel 2 based on an image taken by a camera (not shown) provided within the vehicle, etc. As the hands-on/off judging portion 121, it is possible to use an arrangement besides the arrangements described above as long as the arrangement is capable of judging whether the driver has gripped or released the steering wheel 2.

The hands-on/off judging portion 121 outputs the manual steering mode setting signal S3 when a state in which steering wheel 2 is not gripped by the driver (released state) changes to a state in which it is gripped (gripped state). On the other hand, the hands-on/off judging portion 121 outputs the automatic steering mode setting signal S2 when the gripped state changes to the released state.

Also, if such a hands-on/off judging portion 121 is provided, it is preferable to arrange such that the driver is capable of switching between an operation mode in which the switching between the automatic steering mode and the manual steering mode is performed based on the hands-on/off judging portion 121 and an operation mode in which the switching is performed based on the second and third mode switches 132 and 133.

Figure 14:
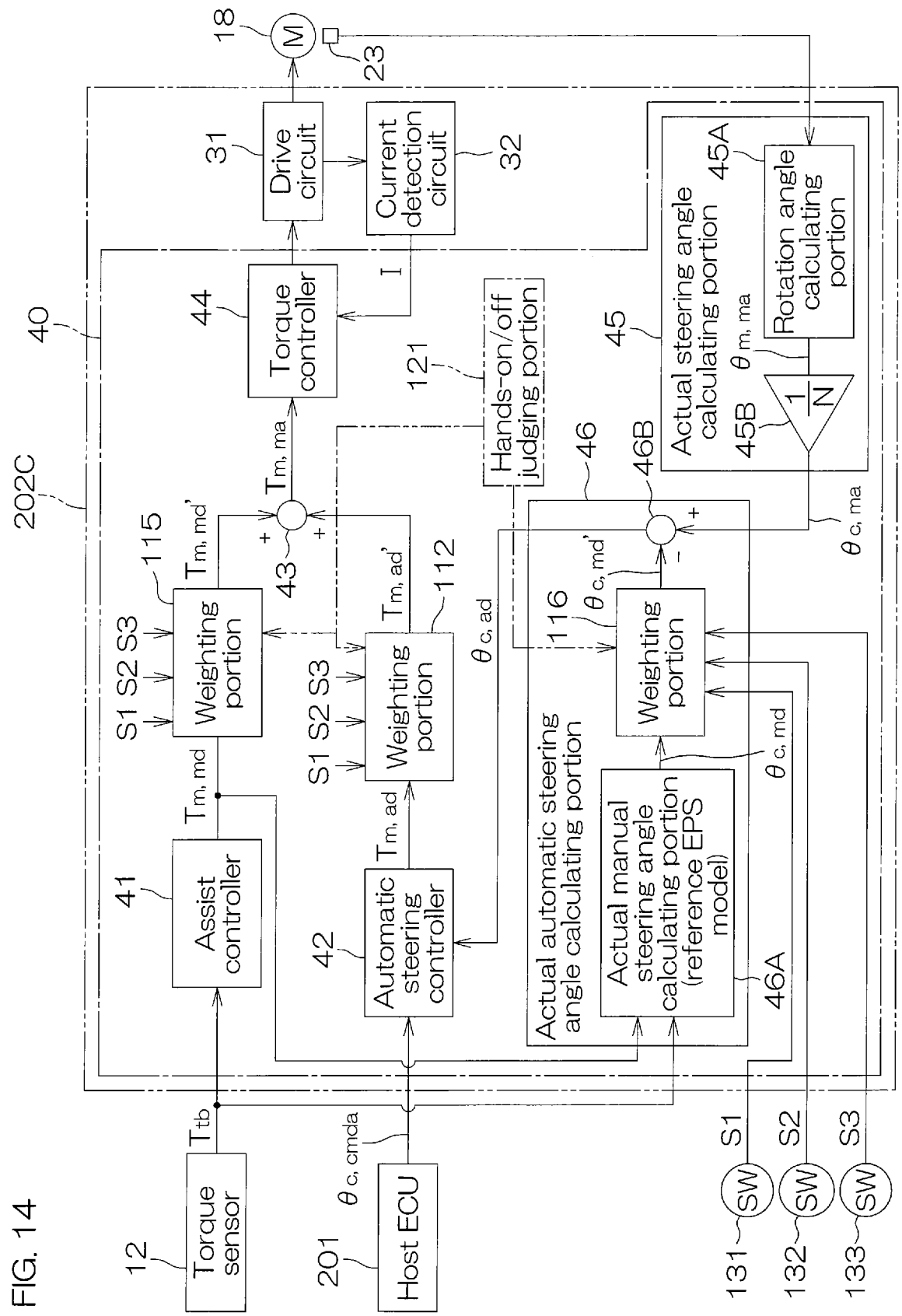
FIG. 14 is a block diagram of a third modification example of the motor controlling ECU.

FIG. 14 is a block diagram of a third modification example of the motor controlling ECU. In FIG. 14, portions corresponding to respective portions of FIG. 11 described above are provided with the same symbols as in FIG. 11 and redundant description shall be omitted.

A motor controlling ECU 202C of FIG. 14 differs from the motor controlling ECU 202B of FIG. 11 in being provided with third and fourth weighting portions 115 and 116 in place of the second weighting portion 113, and the respective mode setting signals S1, S2, and S3 are provided to the first, third, and fourth weighting portions 112, 115, and 116, respectively.

The first weighting portion 112 is an example of a "seventh weighting portion of the present invention," the third weighting portion 115 is an example of an "eighth weighting portion of the present invention," and the fourth weighting portion 116 is an example of a "ninth weighting portion of the present invention."

The third weighting portion 115 is provided between the assist controller 41 and the integrated torque calculating portion 43. The third weighting portion 115 performs a weighting process, in accordance with the mode setting signal S1, S2, or S3 that is input, on the target assist torque $T_{m,md}$ set by the assist controller 41.

Specifically, the third weighting portion 115 first sets a third weight $W_{adx}$ in accordance with the mode setting signal S1, S2, or S3 that has been input. Next, the third weighting portion 115 multiplies the target assist torque $T_{m,md}$ set by the assist controller 41 by the third weight $W_{adx}$. The third weighting portion 115 then provides the product value $W_{adx} \cdot T_{m,md}$ as the target assist torque $T_{m,md}'$ after the weighting process to the integrated torque calculating portion 43.

The fourth weighting portion 116 is provided between the actual manual steering angle calculating portion 46A and the subtractor 46B. The fourth weighting portion 116 performs a weighting process, in accordance with the mode setting signal S1, S2, or S3 that is input, on the actual manual steering angle $\theta_{c,md}$ calculated by the actual manual steering angle calculating portion 46A.

Specifically, the fourth weighting portion 116 first sets a fourth weight $W_{ady}$ in accordance with the mode setting signal S1, S2, or S3 that has been input. Next, the fourth weighting portion 116 multiplies the actual manual steering angle $\theta_{c,md}$ calculated by the actual manual steering angle calculating portion 46A by the fourth weight $W_{ady}$. The fourth weighting portion 116 then provides the product value $W_{ady} \cdot \theta_{c,md}$ as the actual manual steering angle $\theta_{c,md}'$ after the weighting process to the subtractor 46B.

In the third modification example, the subtractor 46B subtracts the actual manual steering angle $\theta_{c,md}'$ after the weighting process from the actual steering angle $\theta_{c,ma}$ to calculate the actual automatic steering angle $\theta_{c,ad}$. Also, the integrated torque calculating portion 43 calculates the target integrated torque $T_{m,ma}$ by adding the target automatic steering torque $T_{m,ad}'$ after the weighting process and the target assist torque $T_{m,md}'$ after the weighting process.

In the third modification example, the fourth weight $W_{ady}$ is set to the same value as the third weight $W_{adx}$ and therefore, in the following description, the third weight $W_{adx}$ and the fourth weight $W_{ady}$ shall be expressed by $W_{md}$.

In the third modification example, when the steering mode is set to the normal steering mode, the first weight $W_{ad}$ and the third and fourth weights $W_{md}$ are set to 1.0. When the steering mode is set to the automatic steering mode, the first weight $W_{ad}$ is set to 1.0 and the third and fourth weights $W_{md}$ are set to zero. When the steering mode is set to the manual steering mode, the first weight $W_{ad}$ is set to zero and the third and fourth weights $W_{md}$ are set to 1.0. Therefore, with the motor controlling ECU 202C, it is made possible, as in the second modification example, to perform switching of the steering mode among the normal steering mode, the automatic steering mode, and the manual steering mode by operation of the mode switches 131, 132, and 133 by the driver. Also, setting of the third and fourth weights $W_{md}$ in accompaniment with the switching of the steering mode is preferably performed in the same manner as in the setting examples of the second weight $W_{md}$ shown in FIG. 13.

By the above, the absolute value of the target automatic steering torque after the weighting process, the absolute value of the target assist torque $T_{m,md}'$ after the weighting process, and the absolute value of the actual manual steering angle $\theta_{c,md}'$ after the weighting process are respectively increased gradually or decreased gradually and therefore, switching among the steering modes is performed smoothly.

Also, as in the second modification example, the automatic steering mode setting signal S2 or the manual steering mode setting signal S3 may be arranged to be generated in accordance with whether the driver has gripped or released the steering wheel 2. Specifically, it suffices that the same hands-on/off judging portion 121 as described with FIG. 11 be provided as indicated by alternate long and two short dashes lines in FIG. 14.

Figure 15:
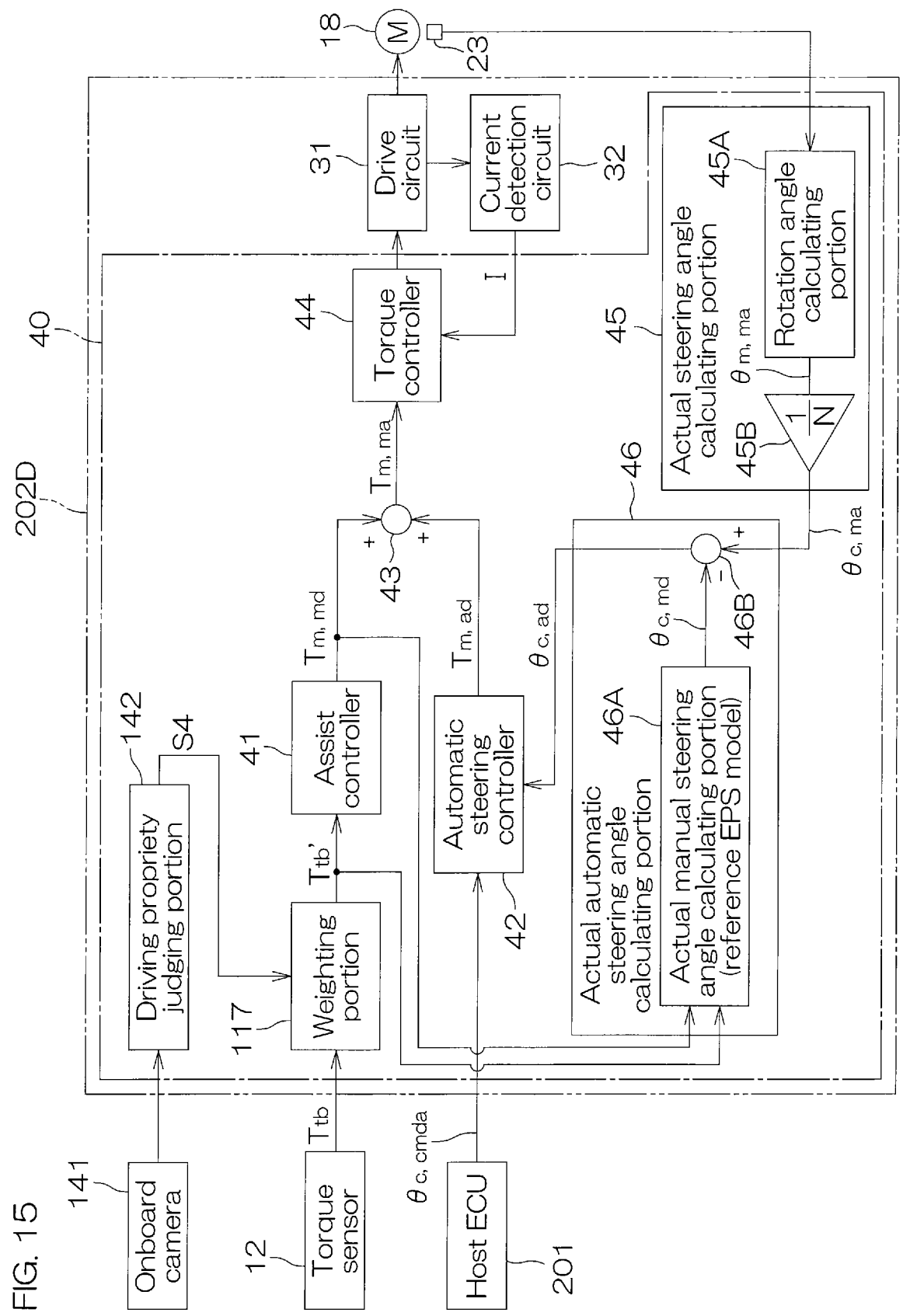
FIG. 15 is a block diagram of a fourth modification example of the motor controlling ECU.

FIG. 15 is a block diagram of a fourth modification example of the motor controlling ECU. In FIG. 15, portions corresponding to respective portions of FIG. 2 described above are provided with the same symbols as in FIG. 2 and redundant description shall be omitted.

A motor controlling ECU 202D of FIG. 15 differs from the motor controlling ECU 202 of FIG. 2 in being provided with a driving propriety judging portion 142 and a weighting portion 117. The weighting portion 117 is an example of a "second weighting portion of the present invention."

The driving propriety judging portion 142 judges whether or not the driver is in a state in which he/she should not be driving based, for example, on a video image of the driver taken by an onboard camera 141 provided within the vehicle. For example, the driving propriety judging portion 142 judges that the driver is in a state in which he/she should not be driving when it judges that a possibility that the driver is dozing is high.

When the driving propriety judging portion 142 judges that the driver is in a state in which he/she should not be driving, it outputs a driving prohibiting signal S4. The driving prohibiting signal S4 is provided to the weighting portion 117.

The weighting portion 117 performs, in accordance with the driving prohibiting signal S4 provided from the driving propriety judging portion 142, a weighting process on the torsion bar torque $T_{tb}$ detected by the torque sensor 12.

Specifically, when the driving prohibiting signal S4 is input, the weighting portion 117 first sets a weight $W_{md}$. Next, the weighting portion 117 multiplies the torsion bar torque $T_{tb}$ detected by the torque sensor 12 by the weight $W_{md}$. The weighting portion 117 then provides the product value $W_{md} \cdot T_{tb}$ as the torsion bar torque $T_{tb}'$ after the weighting process to the assist controller 41 and the actual manual steering angle calculating portion 46A.

The weight $W_{md}$ is set, for example, in accordance with the characteristics shown by the broken line L4 in FIG. 13 described above. That is, from the time t1 at which the driving prohibiting signal S4 is input to the time t2 following the elapse of the predetermined time T, the weight $W_{md}$ decreases gradually from 1.0 to zero. And from the time t2 onward, the weight $W_{md}$ is maintained at zero.

Therefore, when the driving prohibiting signal S4 from the driving propriety judging portion 142 is input into the weighting portion 117, the absolute value of the torsion bar torque $T_{tb}'$ after the weighting process decreases gradually and becomes zero after the elapse of the predetermined time T. And from thereon, the torsion bar torque $T_{tb}'$ after the weighting process is maintained at zero. The steering mode is thereby set to the automatic steering mode and thus thereafter, even if the driver performs a steering operation, the steering operation will no longer be reflected in the motor control. It is thereby enabled to avoid control of the electric motor 18 based on steering operation by the driver when the driver is in a state in which he/she should not be driving.

Also, preferably in the fourth modification example, a mode switch for returning the automatic steering mode to the normal steering mode is provided.

Figure 16:
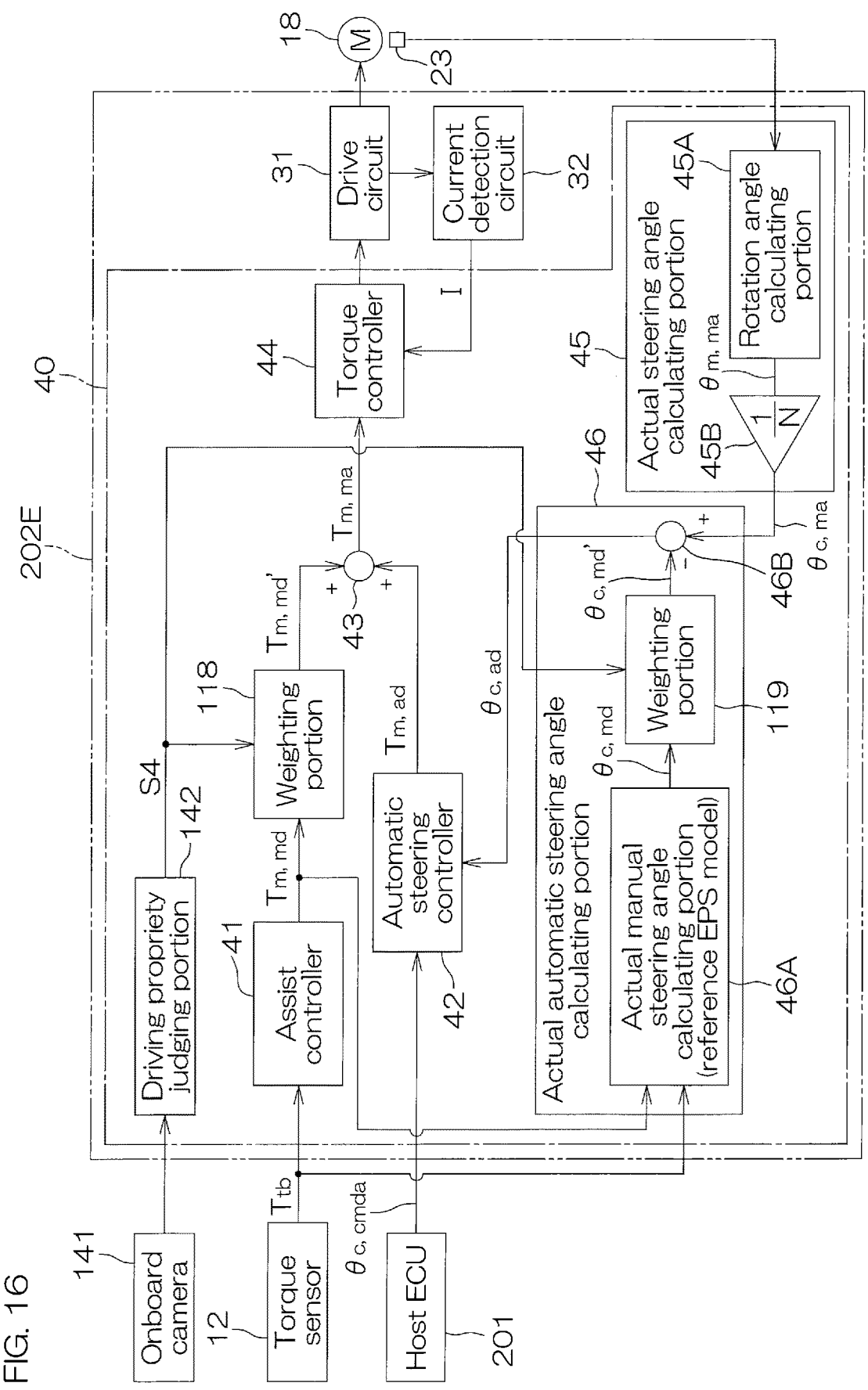
FIG. 16 is a block diagram of a fifth modification example of the motor controlling ECU.

FIG. 16 is a block diagram of a fifth modification example of the motor controlling ECU. In FIG. 16, portions corresponding to respective portions of FIG. 15 described above are provided with the same symbols as in FIG. 15 and redundant description shall be omitted.

A motor controlling ECU 202E of FIG. 16 differs from the motor controlling ECU 202D of FIG. 15 in being provided with a fifth weighting portion 118 and a sixth weighting portion 119 in place of the weighting portion 117. The driving prohibiting signal S4 output by the driving propriety judging portion 142 is provided to the fifth and sixth weighting portions 118 and 119.

The fifth weighting portion 118 is an example of a "third weighting portion of the present invention" and the sixth weighting portion 119 is an example of a "fourth weighting portion of the present invention."

The fifth weighting portion 118 is provided between the assist controller 41 and the integrated torque calculating portion 43. When the driving prohibiting signal S4 is input, the fifth weighting portion 118 first sets a fifth weight $W_{mdx}$. Next, the fifth weighting portion 118 multiplies the target assist torque $T_{m,md}$ set by the assist controller 41 by the fifth weight $W_{mdx}$. The fifth weighting portion 118 then provides the product value $W_{mdx} \cdot T_{m,md}$ as the target assist torque $T_{m,md}'$ after the weighting process to the integrated torque calculating portion 43.

The sixth weighting portion 119 is provided between the actual manual steering angle calculating portion 46A and the subtractor 46B. When the driving prohibiting signal S4 is input, the sixth weighting portion 119 first sets a sixth weight $W_{mdy}$. Next, the sixth weighting portion 119 multiplies the actual manual steering angle $\theta_{c,md}$ calculated by the actual manual steering angle calculating portion 46A by the sixth weight $W_{mdy}$. The sixth weighting portion 119 then provides the product value $W_{mdy} \cdot \theta_{c,md}$ as the actual manual steering angle $\theta_{c,md}'$ after the weighting process to the subtractor 46B.

In the present preferred embodiment, the sixth weight $W_{mdy}$ is set to the same value as the fifth weight $W_{mdx}$ and therefore, in the following description, the fifth weight $W_{mdx}$ and the sixth weight $W_{mdy}$ shall be expressed by $W_{md}$. As in the fourth modification example, the weight $W_{md}$ is set, for example, in accordance with the characteristics shown by the broken line L4 in FIG. 13 described above.

Therefore, when the driving prohibiting signal S4 from the driving propriety judging portion 142 is input into the weighting portion 117, the absolute value of the target assist torque $T_{m,md}'$ after the weighting process and the absolute value of the actual manual steering angle $\theta_{c,md}'$ after the weighting process decrease gradually and become zero after the elapse of the predetermined time T. And from thereon, the target assist torque $T_{m,md}'$ after the weighting process and the actual manual steering angle $\theta_{c,md}'$ after the weighting process are maintained at zero.

The steering mode is thereby set to the automatic steering mode and thus thereafter, even if the driver performs a steering operation, the steering operation will no longer be reflected in the motor control. It is thereby enabled to avoid control of the electric motor 18 based on steering operation by the driver when the driver is in a state in which he/she should not be driving.

Although the preferred embodiment of the present invention has been described above, it is also possible to implement the present invention in yet other modes.

For example, with the preferred embodiment described above, the steering torque (torsion bar torque $T_{tb}$) and the assist control amount (target assist torque $T_{m,md}$) are the inputs to the actual manual steering angle calculating portion (reference EPS model) 46A. However, it suffices that at least one of either of the steering torque and the assist control amount be the input to the actual manual steering angle calculating portion 46A.

For example, if the actual manual steering angle calculating portion 46A calculates the actual manual steering angle $\theta_{c,md}$ using a reference model corresponding to a steering system that does not have a steering assisting mechanism, the actual manual steering angle calculating portion 46A calculates the actual manual steering angle $\theta_{c,md}$ based on the steering torque.

Even when the actual manual steering angle calculating portion 46A calculates the actual manual steering angle $\theta_{c,md}$ using the reference EPS model, it is possible to estimate (possible to calculate) the assist control amount from the steering torque and therefore, the actual manual steering angle calculating portion 46A is capable of calculating the actual manual steering angle $\theta_{c,md}$ based on the steering torque. Also, the absolute value of the assist control amount is large in comparison to the absolute value of the steering torque and therefore, the actual manual steering angle calculating portion 46A is also capable of calculating the actual manual steering angle $\theta_{c,md}$ based on the assist control amount without using the steering torque.

Also, the steering torque input into the actual manual steering angle calculating portion 46A is not restricted to the torsion bar torque $T_{tb}$ (torque sensor detection value) and may instead be a driver torque (estimate) applied to the handle by the driver.

Also, for example, although with the preferred embodiment described above, the actual manual steering angle calculating portion 46A (see FIG. 2) calculates the actual manual steering angle $\theta_{c,md}$ based on the reference EPS model, the actual manual steering angle calculating portion 46A may instead calculate the actual manual steering angle $\theta_{c,md}$ by another method.

For example, the actual manual steering angle calculating portion 46A may set the actual manual steering angle $\theta_{c,md}$ using a map that stores, for each combination of the torsion bar torque $T_{tb}$ and the target assist torque $T_{m,md}$, a relationship of the combination and the actual manual steering angle $\theta_{c,md}$. More specifically, the actual manual steering angle calculating portion 46A acquires, from the map, the actual manual steering angle $\theta_{c,md}$ corresponding to the combination of the torsion bar torque $T_{tb}$ detected by the torque sensor 12 and the target assist torque $T_{m,md}$ set by the assist controller 41.

Also, although with the preferred embodiment described above, the automatic steering controller 42 (see FIG. 5) includes the feedforward controller 63, the feedforward controller 63 may be omitted. In this case, the feedback control torque $T_{fb}$ calculated by the feedback controller 62 becomes the target basic torque.

Also, although with the preferred embodiment described above, an example of a case of applying the present invention to motor control of a column type EPS was illustrated, it is possible to apply the present invention also to motor control of an EPS besides a column type. Also, it is possible to apply the present invention to control of an electric motor for steering angle control of a steer-by-wire system.

While a preferred embodiment of the present invention has been described in detail above, this is merely a specific example used to clarify the technical content of the present invention, and the present invention should not be interpreted as being limited only to this specific example, and the scope of the present invention shall be limited only by the appended claims.

The present application corresponds to Japanese Patent Application No. 2018-097395 filed on May 21, 2018 in the Japan Patent Office and to Japanese Patent Application No. 2018-182676 filed on Sep. 27, 2018 in the Japan Patent Office, and the entire disclosures of these applications are incorporated herein by reference.

REFERENCE SIGNS LIST

1 . . . electric power steering system, 3 . . . turned wheel, 4 . . . turning mechanism, 18 . . . electric motor, 41 . . . assist controller, 42 . . . automatic steering controller, 43 . . . integrated torque calculating portion (integrated control amount calculating portion), 44 . . . torque controller (controller), 45 . . . actual steering angle calculating portion, 45A . . . rotation angle calculating portion, 45B . . . speed reduction ratio divider, 46 . . . actual automatic steering angle calculating portion, 46A . . . actual manual steering angle calculating portion, 46B . . . subtractor, 61 . . . low-pass filter (LPF), 62 . . . feedback controller, 63 . . . feedforward controller, 64 . . . disturbance torque estimator (disturbance observer), 65 . . . torque adder, 66 . . . disturbance torque compensator, 111 to 113, 115 to 119 . . . weighting portion

The invention claimed is:

1. A motor control device comprising:
   a torque detector that is arranged to detect a steering torque;
   a steering angle detector that is arranged to detect an actual steering angle;
   an automatic steering controller that sets an automatic steering control amount;
   an assist controller that sets an assist control amount using the steering torque;
   an integrated control amount calculating portion that calculates an integrated control amount by adding the automatic steering control amount and the assist control amount; and
   a controller that controls, based on the integrated control amount, an electric motor for steering angle control; and
   wherein the motor control device further comprises: an actual automatic steering angle calculating portion that calculates, based on at least one of either of the steering torque and the assist control amount and on the actual steering angle, an actual automatic steering angle that is a steering angle due to automatic steering control and included in the actual steering angle; and
   the automatic steering controller
   sets the automatic steering control amount using a target automatic steering angle and the actual automatic steering angle.

2. The motor control device according to claim 1, wherein the actual automatic steering angle calculating portion includes
   an actual manual steering angle calculating portion that calculates, based on at least one of either of the steering torque and the assist control amount, an actual manual steering angle that is a steering angle due to manual steering and assist control and included in the actual steering angle and
   a subtractor that calculates the actual automatic steering angle by subtracting the actual manual steering angle from the actual steering angle.

3. The motor control device according to claim 2, wherein the actual manual steering angle calculating portion is arranged to calculate the actual manual steering angle using a reference model of a steering system that includes the electric motor.

4. The motor control device according to claim 2, further comprising: a third weighting portion that performs, in accordance with predetermined third information, a weighting process on the assist control amount set by the assist controller; and
   a fourth weighting portion that performs, in accordance with predetermined fourth information, a weighting process on the actual manual steering angle calculated by the actual manual steering angle calculating portion; and
   wherein the subtractor is arranged to calculate the actual automatic steering angle by subtracting the actual manual steering angle after the weighting process by the fourth weighting portion from the actual steering angle, and
   the integrated control amount calculating portion is arranged to calculate the integrated control amount by adding the automatic steering control amount and the assist control amount after the weighting process by the third weighting portion.

5. The motor control device according to claim 2, further comprising: a seventh weighting portion that performs, in accordance with predetermined seventh information, a weighting process on the automatic steering control amount set by the automatic steering controller;
   an eighth weighting portion that performs, in accordance with predetermined eighth information, a weighting process on the assist control amount set by the assist controller; and
   a ninth weighting portion that performs, in accordance with predetermined ninth information, a weighting process on the actual manual steering angle calculated by the actual manual steering angle calculating portion; and
   wherein the subtractor is arranged to calculate the actual automatic steering angle by subtracting the actual manual steering angle after the weighting process by the ninth weighting portion from the actual steering angle, and
   the integrated control amount calculating portion is arranged to calculate the integrated control amount by adding the automatic steering control amount after the weighting process by the seventh weighting portion and the assist control amount after the weighting process by the eighth weighting portion.

6. The motor control device according to claim 1, wherein the automatic steering controller includes
   a disturbance torque estimator that uses the automatic steering control amount and the actual automatic steering angle to calculate an automatic disturbance torque estimate that is an estimate of a disturbance torque corresponding to automatic steering and included in a disturbance torque besides a motor torque acting on a driven object of the electric motor and an estimate of the actual automatic steering angle,
   a target basic torque calculating portion that calculates a target basic torque using the target automatic steering angle and the estimate of the actual automatic steering angle, and
   a disturbance torque compensator that corrects the target basic torque by the automatic disturbance torque estimate.

7. The motor control device according to claim 1, wherein the automatic steering controller includes
   a disturbance torque estimator that uses the automatic steering control amount and the actual automatic steering angle to calculate an automatic disturbance torque estimate that is an estimate of a disturbance torque corresponding to automatic steering and included in a disturbance torque besides a motor torque acting on a driven object of the electric motor,
   a target basic torque calculating portion that calculates a target basic torque using the target automatic steering angle and the actual automatic steering angle, and a disturbance torque compensator that corrects the target basic torque by the automatic disturbance torque estimate.

8. The motor control device according to claim 1, further comprising: a first weighting portion that performs, in accordance with predetermined first information, a weighting process on the automatic steering control amount set by the automatic steering controller; and wherein the integrated control amount calculating portion is arranged to calculate the integrated control amount by adding the automatic steering control amount after the weighting process by the first weighting portion and the assist control amount.

9. The motor control device according to claim 1, further comprising: a second weighting portion that performs, in accordance with predetermined second information, a weighting process on the steering torque detected by the torque detector; and wherein the assist controller is arranged to set the assist control amount using the steering torque after the weighting process by the second weighting portion, the actual automatic steering angle calculating portion is arranged to calculate the actual automatic steering angle based on the steering torque after the weighting process by the second weighting portion, the assist control amount calculated by the assist controller, and the actual steering angle, and the integrated control amount calculating portion is arranged to calculate the integrated control amount by adding the automatic steering control amount and the assist control amount calculated by the assist controller.

10. The motor control device according to claim 1, further comprising: a fifth weighting portion that performs, in accordance with predetermined fifth information, a weighting process on the automatic steering control amount set by the automatic steering controller; and a sixth weighting portion that performs, in accordance with predetermined sixth information, a weighting process on the steering torque detected by the torque detector; and wherein the assist controller is arranged to set the assist control amount using the steering torque after the weighting process by the sixth weighting portion, the actual automatic steering angle calculating portion is arranged to calculate the actual automatic steering angle based on the steering torque after the weighting process by the sixth weighting portion, the assist control amount calculated by the assist controller, and the actual steering angle, and the integrated control amount calculating portion is arranged to calculate the integrated control amount by adding the automatic steering control amount after the weighting process by the fifth weighting portion and the assist control amount calculated by the assist controller.

* * * * *